US006921738B2

(12) United States Patent
Hwang et al.

(10) Patent No.: US 6,921,738 B2
(45) Date of Patent: Jul. 26, 2005

(54) CATALYTIC METAL PLATE

(75) Inventors: H. Shinn Hwang, Livingston, NJ (US);
Joseph C. Dettling, Howell, NJ (US);
Michael P. Galligan, Clark, NJ (US);
Ronald J. Brown, Edison, NJ (US);
John J. Mooney, Wyckoff, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/689,164

(22) Filed: Oct. 20, 2003

(65) Prior Publication Data

US 2004/0087439 A1 May 6, 2004

Related U.S. Application Data

(63) Continuation of application No. 09/917,847, filed on Jul. 26, 2001, now abandoned, which is a continuation of application No. 08/761,544, filed on Dec. 6, 1996, now abandoned.

(51) Int. Cl.$^7$ ............................. B01J 21/08; B32B 15/04
(52) U.S. Cl. ............. 502/240; 502/527.12; 502/527.13; 502/527.15; 428/457
(58) Field of Search ..................... 428/457; 502/527.12, 502/527.13, 527.15, 240–340

(56) References Cited

U.S. PATENT DOCUMENTS

| | | | |
|---|---|---|---|
| 1,927,963 A | 9/1933 | Taylor | 23/234 |
| 3,524,721 A | 8/1970 | Stephens | 23/2 |
| 3,545,917 A | 12/1970 | Stephens | 23/2 |
| 3,552,913 A | 1/1971 | Stephens | 23/2 |
| 3,676,370 A | 7/1972 | Stephens | 252/455 |
| 3,787,560 A | 1/1974 | Stephens | 423/239 |
| 3,899,444 A | 8/1975 | Stephens | 252/455 |
| 3,907,821 A | 9/1975 | Retallick | 252/410 |
| 3,956,185 A | 5/1976 | Yagi et al. | 252/455 R |

(Continued)

FOREIGN PATENT DOCUMENTS

| | | | | |
|---|---|---|---|---|
| AU | 615721 | * | 8/1989 | |
| DE | 37 29 683 A1 | | 3/1989 | ............. F01N/3/28 |
| JP | 50145381 | * | 11/1975 | |
| JP | 57105240 | * | 6/1982 | |
| JP | 59052530 | * | 3/1984 | |
| JP | 59127649 | * | 7/1984 | |
| JP | 60019036 | * | 5/1985 | |
| JP | 5031828 | * | 7/1985 | |
| JP | 60232253 | * | 11/1985 | |
| JP | 71538 | * | 4/1987 | |
| JP | 63007895 | * | 1/1988 | |
| JP | 63077544 | * | 4/1988 | |
| JP | 63205141 | * | 8/1988 | |
| JP | 63240947 | * | 10/1988 | |
| JP | 01210032 | * | 8/1989 | |
| WO | WO 95/00235 | * | 1/1995 | |
| WO | WO 95/35152 | * | 12/1995 | |
| WO | WO 96/26006 | | 8/1996 | ............. B01J/37/34 |
| WO | WO 97/01023 | | 1/1997 | ............. F01N/3/28 |

OTHER PUBLICATIONS

Emission Control by Retrofitting Motorcycles with Catalytic Converter, L.K. Hwang, P.H. Hsieh, J. Wang, W.B. Wang, Industrial Technology Research Institute, R.O.C., Small Engine Technology Conference, vol. II, pp. 1009–1016, Dec. 1–3, 1993, Pisa, Italy.**

U.S. Appl. No. 08/682,247, filed Jul. 17, 1996, Hwang et al.

*Primary Examiner*—David Sample
*Assistant Examiner*—Patricia L. Hailey
(74) *Attorney, Agent, or Firm*—Richard A. Negin

(57) ABSTRACT

The present invention is directed to a catalyzed metallic substrate, such as a metal plate. There is a catalyst layer supported on the substrate surface. The article is useful as part of exhaust systems which can be used with small engines for applications such as motorcycles, lawn mowers, chain saws, weed trimmers and the like. The present invention includes methods to prepare the catalyzed metal substrate and methods of use of the catalyzed substrate.

41 Claims, 12 Drawing Sheets

U.S. PATENT DOCUMENTS

| | | | |
|---|---|---|---|
| 3,956,188 A | 5/1976 | Hindin et al. | 252/465 |
| 3,993,572 A | 11/1976 | Hindin et al. | 252/462 |
| 4,021,185 A | 5/1977 | Hindin et al. | 431/7 |
| 4,134,860 A | 1/1979 | Hindin et al. | 252/466 |
| 4,157,316 A | 6/1979 | Thompson et al. | 252/462 |
| 4,171,288 A | 10/1979 | Keith et al. | 252/462 |
| 4,189,404 A | 2/1980 | Keith et al. | 252/462 |
| 4,294,726 A | 10/1981 | Boxon et al. | 252/462 |
| 4,438,219 A | 3/1984 | Brandenburg et al. | 502/333 |
| 4,476,246 A | 10/1984 | Kim et al. | 502/304 |
| 4,504,598 A | 3/1985 | Ono et al. | 502/303 |
| 4,587,231 A | 5/1986 | Sawamura et al. | 502/304 |
| 4,591,518 A | 5/1986 | Schillinger et al. | 427/385.5 |
| 4,591,578 A | 5/1986 | Foley et al. | 502/185 |
| 4,591,580 A | 5/1986 | Kim et al. | 502/303 |
| 4,624,940 A | 11/1986 | Wan et al. | 502/251 |
| 4,675,308 A | 6/1987 | Wan et al. | 502/304 |
| 4,678,770 A | 7/1987 | Wan et al. | 502/304 |
| 4,708,946 A | 11/1987 | Ohata et al. | 502/304 |
| 4,714,694 A | 12/1987 | Wan et al. | 502/304 |
| 4,727,052 A | 2/1988 | Wan et al. | 502/327 |
| 4,780,447 A | 10/1988 | Kim et al. | 502/243 |
| 4,804,796 A | 2/1989 | Wang et al. | 585/269 |
| 4,806,519 A | 2/1989 | Chiba et al. | 502/252 |
| 4,808,564 A | 2/1989 | Matsumoto et al. | 502/303 |
| 4,923,842 A | 5/1990 | Summers | 502/261 |
| 4,965,243 A | 10/1990 | Yamada et al. | 502/304 |
| 5,015,617 A | 5/1991 | Ohata et al. | 502/304 |
| 5,051,392 A | 9/1991 | Mabilon et al. | 502/303 |
| 5,057,483 A | 10/1991 | Wan | 502/304 |
| 5,106,802 A | 4/1992 | Horiuchi et al. | 502/65 |
| 5,128,306 A | 7/1992 | Dettling et al. | 502/304 |
| 5,130,109 A | 7/1992 | Wan | 423/213.2 |
| 5,139,992 A | 8/1992 | Tauster et al. | 502/304 |
| 5,204,302 A | 4/1993 | Gorynin et al. | 502/2 |
| 5,208,206 A | 5/1993 | Yasaki et al. | 502/334 |
| 5,212,142 A | 5/1993 | Dettling | 502/304 |
| 5,234,882 A | 8/1993 | Pfefferle | 502/314 |
| 5,254,519 A | 10/1993 | Wan et al. | 502/252 |
| 5,466,651 A * | 11/1995 | Pfefferle | 502/304 |
| 5,490,977 A | 2/1996 | Wan et al. | 423/210 |
| 5,597,771 A * | 1/1997 | Hu et al. | 502/304 |
| 5,795,456 A | 8/1998 | Friedman et al. | 204/471 |
| 5,898,014 A | 9/1999 | Wu et al. | 502/302 |
| 5,948,377 A | 9/1999 | Sung | 423/213.5 |
| 5,981,427 A | 11/1999 | Sung et al. | 502/325 |
| 6,087,298 A | 7/2000 | Sung et al. | 502/333 |
| 2002/0111266 A1 * | 8/2002 | Labarge et al. | 502/171 |

* cited by examiner

CATALYTIC METAL PLATE

This application is a continuation of application Ser. No. 09/917,847 filed Jul. 26, 2001, now abandoned, which is a continuation of application Ser. No. 08/761,544 filed Dec. 6, 1996, having a Continued Prosecution Application filed Jun. 21, 2000, now abandoned.

BACKGROUND OF THE INVENTION

1. Field of the Invention

The present invention relates to a catalytic metal article, and in more specific embodiments a catalytic metal plate and related methods of preparation and use. The article of present invention is useful for the treatment of gases to reduce contaminants contained therein.

2. Discussion of Related Art

The exhaust gases of internal combustion engines, including small engines, are known to contain pollutants such as hydrocarbons, carbon monoxide and nitrogen oxides ($NO_x$) that foul the air.

Small internal combustion engines, usually two-stroke and four-stroke spark ignition engines are used to provide power to a variety of machinery, e.g. gasoline-engine powered lawn mowers, chain saws, leaf blowers, string cutters, leaf blowers, motor scooters, motorcycles, mopeds and the like. Such engines provide a severe environment for a catalytic exhaust treatment apparatus. This is because in small engines, the exhaust gas contains a high concentration of unburned fuel and unconsumed oxygen. A catalyst member can be mounted downstream of the engine inside another structure such as a muffler, as described in commonly assigned U.S. Ser. No. 08/682,247, herein incorporated by reference.

Additionally, the vibrational force in a two-stroke engine can be three or four times that of a four-stroke engine. For example, vibrational accelerations of 70 G to 90 G (G=gravitational acceleration) at 150 hertz (Hz) have been reported for small engines. The harsh vibration and exhaust gas temperature conditions associated with small engines lead to several modes of failure in the exhaust gas catalytic treatment apparatus, including failure of the mounting structure by which a catalyst member is secured in the apparatus and consequential damage or destruction of the catalyst member due to the mechanical vibration and to flow fluctuation of the exhaust gas under high temperature conditions. The catalyst member usually comprises a ceramic-like carrier member that has a plurality of fine parallel gas flow passages extending therethrough (sometimes referred to as a "honeycomb") and which is typically made of, e.g., cordierite, mullite, etc., on which a catalytic material is coated. A typical carrier member has cells spaced 2.54 thick. The ceramic-like material is subject to cracking and pulverization by excessive vibration. While ceramic and metal monolithic honeycomb catalysts are known to be used in small engine applications, it is desirable to have an alternative design which avoids the fatigue.

Catalysts useful in small engine applications are described in U.S. Ser. No. 08/682,247, hereby incorporated by reference. Briefly such catalysts comprise one or more platinum group metal compounds or complexes which can be on a suitable support material. The term "compound", as in "platinum group metal compound" means any compound, complex, or the like of a catalytic component which, upon calcination or use of the catalyst, decomposes or otherwise converts to a catalytically active form, which is often an oxide or metal. Various compounds or complexes of one or more catalytic components may be dissolved or suspended in any liquid which will wet or impregnate the support material.

Suitable support materials include refractory oxides such as alumina, silica, titania, silica-alumina, aluminosilicats, aluminum-zirconium oxide,, aluminum-chromium oxide, etc. Such materials are preferably used in their high surface area forms. For example, gamma-alumina is preferred over alpha-alumina. It is known to stabilize high surface area support materials by impregnating the material with a stabilizer species.

The catalytic materials are typically used in particulate form with particles in the micron-sized range, e.g., 10 to 20 microns in diameter, so that they can be formed into a slurry and applied as a washcoat on a carrier member. Suitable carrier members may be employed, such as a honeycomb-type carrier of the type having a plurality of fine, parallel gas-flow passages extending therethrough from an inlet or an outlet face of the carrier so that the passages are open to fluid-flow therethrough. Such honeycomb-type carrier may be made of any suitable refractory material such as cordierite, cordierite-alpha-alumina, silicon nitride, zirconium mullite, spodumene, alumina-silica magnesia, zirconium silicate, sillimanite, magnesium silicates, zirconium oxide, petallite, alpha-alumina and aluminosilicates. Alternatively, a honeycomb-type carrier may be made of a refractory metal such as a stainless steel or other suitable iron-based, corrosion-resistant alloys which can contain aluminum. The coater carrier is disposed in a canister suited to protect the catalyst member and to facilitate establishment of a gas flow path through the catalyst member, as is known in the art.

Three-way conversion catalysts (TWC) have utility in a number of fields including the treatment of exhaust from internal combustion engines, such as automobile and other gasoline-fueled engines. Catalytic converters containing a TWC catalyst can be located in the exhaust gas line of internal combustion engines. The catalysts promote the oxidation by oxygen in the exhaust gas of the unburned hydrocarbons and carbon monoxide and the reduction of nitrogen oxides to nitrogen.

Known TWC catalysts which exhibit good activity and long life comprise one or more platinum group metals (e.g., platinum or palladium, rhodium, ruthenium and iridium) located upon a high surface area, refractory oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material.

U.S. Pat. No. 4,134,860 relates to the manufacture of catalyst structures. The catalyst composition can contain platinum group metals, base metals, rare earth metals and refractory, such as alumina support. The composition can be deposited on a relatively inert carrier such as a honeycomb.

High surface area alumina support materials, also referred to as "gamma alumina" or "activated alumina", typically exhibit a BET surface area in excess of 60 square meters per gram ("$m^2/g$") often up to about 200 $m^2/g$ or more. Such activated alumina is usually a mixture of the gamma and delta phases of alumina, but may also contain substantial amounts of eta, kappa and theta alumina phases. It is known to utilize refractory metal oxides other than activated alumina as a support for at least some of the catalytic components in a given catalyst. For example, bulk ceria, zirconia, alpha alumina and other materials are known for such use.

Although many of these materials suffer from the disadvantage of having a considerably lower BET surface area than activated alumina, that disadvantage tends to be offset by a greater durability of the resulting catalyst.

It is a known expedient in the art to stabilize alumina supports against such thermal degradation by the use of materials such as zirconia, titania, alkaline earth metal oxides such as baria, calcia or strontia or rare earth metal oxides, such as ceria, lanthana and mixtures of two or more rare earth metal oxides. For example, see C. D. Keith, et al. U.S. Pat. No. 4,171,288.

Bulk cerium oxide (ceria) is disclosed to provide an excellent refractory oxide support for platinum group metals other than rhodium. U.S. Pat. No. 4,714,694 of C. Z. Wan, et al., discloses aluminum-stabilized bulk ceria, to serve as a refractory oxide support for platinum group metal components impregnated thereon. The use of bulk ceria as a catalyst support for platinum group metal catalysts other than rhodium, is also disclosed in U.S. Pat. No. 4,727,052 of C. Z. Wan, et al. and in U.S. Pat. No. 4,708,946 of Ohata, et al.

U.S. Pat. No. 4,808,564 discloses a catalyst which comprises oxides of lanthanum and cerium in which the molar fraction of lanthanum atoms to total rare earth atoms is 0.05 to 0.20 and the ratio of the number of the total rare earth atoms to the number of aluminum atoms is 0.05 to 0.25.

U.S. Pat. No. 4,438,219 discloses a stable alumina supported catalyst for use on a substrate. The stabilizing material is disclosed to be one of several compounds including those derived from barium, silicon, rare earth metals, alkali and alkaline earth metals, boron, thorium, hafnium and zirconium.

U.S. Pat. Nos. 4,294,726, 4,476,246, 4,591,578 and 4,591,580 disclose three-way catalyst compositions comprising alumina, ceria, an alkali metal oxide promoter and noble metals. U.S. Pat. Nos. 3,993,572 and 4,157,316 represent attempts to improve the catalyst efficiency of Pt/Rh based TWC systems by incorporating a variety of metal oxides, e.g., rare earth metal oxides such as ceria and base metal oxides such as nickel oxides. U.S. Pat. No. 4,591,518 discloses a catalyst comprising an alumina support with components deposited thereon consisting essentially of a lanthana component, ceria, an alkali metal oxide and a platinum group metal. U.S. Pat. No. 4,591,580 discloses an alumina supported platinum group metal catalyst. The support is sequentially modified to include support stabilization by lanthana or lanthana rich rare earth oxides, double promotion by ceria and alkali metal oxides and optionally nickel oxide. Palladium containing catalyst compositions e.g. U.S. Pat. No. 4,624,940 have been found useful for high temperature applications.

U.S. Pat. Nos. 3,956,188 and 4,021,185 disclose a catalyst composition having (a) a catalytically active, calcined composite of alumina, a rare earth metal oxide and a metal oxide selected from the group consisting of an oxide of chromium, tungsten, a group IVB metal and mixtures thereof and (b) a catalytically effective amount of a platinum group metal added thereto after calcination of said composite. The rare earth metals include cerium, lanthanum and neodymium.

U.S. Pat. No. 4,780,447 discloses a catalyst which is capable of controlling HC, CO and $NO_x$ as well as $H_2S$ in emissions from the tailpipe of catalytic converter equipped automobiles. The use of the oxides of nickel and/or iron is disclosed as an $H_2S$ gettering compound.

U.S. Pat. No. 4,965,243 discloses a method to improve thermal stability of a TWC catalyst containing precious metals by incorporating a barium compound and a zirconium compound together with ceria and alumina.

J01210032 (and AU-615721) discloses a catalytic composition comprising palladium, rhodium, active alumina, a cerium compound, a strontium compound and a zirconium compound. These patents suggest the utility of alkaline earth metals in combination with ceria, and zirconia to form a thermally stable alumina supported palladium containing washcoat.

U.S. Pat. Nos. 4,624,940 and 5,057,483 disclose compositions including ceria-zirconia containing particles. The '483 patent discloses that neodymium and/or yttrium can be added to the ceria-zirconia composite to modify the resultant oxide properties as desired. U.S. Pat. No. 4,504,598 discloses a process for producing a high temperature resistant TWC catalyst. The process includes forming an aqueous slurry of particles of gamma or other activated alumina and impregnating the alumina with soluble salts of selected metals including cerium, zirconium, at least one of iron and nickel and at least one of platinum, palladium and rhodium and, optionally, at least one of neodymium, lanthanum, and praseodymium.

U.S. Pat. Nos. 3,787,560, 3,676,370, 3,552,913, 3,545,917, 3,524,721 and 3,899,444 all disclose the use of neodymium oxide for use in reducing nitric oxide in exhaust gases of internal combustion engines. U.S. Pat. No. 3,899,444 discloses that rare earth metals of the lanthanide series are useful with alumina to form an activated stabilized catalyst support when calcined at elevated temperatures. Such rare earth metals are disclosed to include lanthanum, cerium, praseodymium, neodymium and others.

TWC catalyst systems comprising a carrier and two or more layers of refractory oxide are disclosed. One of the purposes of using catalysts having two or more layers is to isolate constituents of compositions in different layers to prevent interaction of the catalysts. Recent disclosures regarding catalysts comprising two or more layers are included in U.S. Ser. No. 08/645,985 and in European Patent Application Nos. 95/00235 and 95/35152. Two layer catalyst structures are disclosed in Japanese Patent Publication No. 145381/1975, Japanese Patent Publication No. 127649/1984, Japanese Patent Publication No. 19036/1985, Japanese Patent Publication No. 232253/1985, Japanese Kokai 71538/87, Japanese Patent Publication No. 105240/1982, Japanese Patent Publication No. 31828/1985, U.S. Pat. No. 4,806,519, JP88-240947, J63-205141A, J63-077544A and J63-007895A.

Japanese Patent Publication No. 52530/1984 discloses a catalyst having a first porous carrier layer composed of an inorganic support and a heat-resistant noble metal-type catalyst deposited on the surface of the support and a second heat-resistant non-porous granular carrier layer having deposited thereon a noble metal-type catalyst, said second carrier layer being formed on the surface of the first carrier layer and having resistance to the catalyst poison.

U.S. Pat. No. 4,587,231 discloses a method of producing a monolithic three-way catalyst for the purification of exhaust gases. First, a mixed oxide coating is provided to a monolithic carrier by treating the carrier with a coating slip in which an active alumina powder containing cerium oxide is dispersed together with a ceria powder and then baking the treated carrier. Next platinum, rhodium and/or palladium are deposited on the oxide coating by a thermal decomposition. Optionally, a zirconia powder may be added to the coating slip.

U.S. Pat. No. 4,923,842 discloses a catalytic composition for treating exhaust gases comprising a first support having dispersed thereon at least one oxygen storage component and at least one noble metal component, and having dispersed immediately thereon an overlayer comprising lanthanum oxide and optionally a second support. The layer of catalyst is separate from the lanthanum oxide. The noble metal can include platinum, palladium, rhodium, ruthenium and iridium. The oxygen storage component can include the oxide of a metal from the group consisting of iron, nickel, cobalt and the rare earths. Illustrative of these are cerium, lanthanum, neodymium, praseodymium, etc.

U.S. Pat. No. 5,057,483, referred to above, discloses a catalyst composition suitable for three-way conversion of internal combustion engine, e.g., automobile gasoline engine, exhaust gases and includes a catalytic material disposed in two discrete coats on a carrier. The first coat includes a stabilized alumina support on which a first platinum catalytic component is dispersed. The first coat also includes bulk ceria, and may also include bulk iron oxide, a metal oxide (such as bulk nickel oxide) which is effective for the suppression of hydrogen sulfide emissions, and one or both of baria and zirconia dispersed throughout as a thermal stabilizer. The second coat, which may comprise a top coat overlying the first coat, contains a co-formed (e.g., co-precipitated) rare earth oxide-zirconia support on which a first rhodium catalytic component is dispersed, and a second activated alumina support having a second platinum catalytic component dispersed thereon. The second coat may also include a second rhodium catalytic component, and optionally, a third platinum catalytic component, dispersed as an activated alumina support.

Emission control by retrofitting small engines such as those used on motorcycles with catalytic converters is disclosed in references such as Li-Kung Hwang, Pan-Hsiang Hsieh, James Wang, Wen-Bin Wang, Industrial Technology Research, Institute R.O.C., Small Engine Technology Conference, Volume II, Dec. 1–3, 1993, Pisa, Italy, pages 1009–1016. This reference discloses a wide range of motorcycle models retrofitted with catalytic converters to demonstrate the emission control strategy. The catalytic converters used had substrates which included ceramic and metallic substrates including a tube type substrate.

SUMMARY OF THE INVENTION

The present invention is directed to a catalytic metal article and related methods of preparation and use. The article comprises a metal substrate which is preferably in the form of a metallic plate. The metallic plate preferably comprises up to 20.0 weight percent aluminum. A preferred metal is a steel composition comprising iron, aluminum and preferably chromium. The metal substrate has a substrate surface. For the purpose of the present invention, the term substrate surface is considered to be the surface of the metal substrate and can include a thin layer which can be up to 10 micrometers thick or more which is derived from metal within the metal substrate which defuses to the surface, or from metal which is plated or clad onto the surface. The metal of the substrate surface is preferably in a continuous layer up to about 5 micrometers thick and is preferably selected from aluminum and rare earth metals. The substrate surface metal can be oxidized by calcining in the presence of oxygen in a temperature range of from about 800° to about 1200° C. Preferably the substrate surface comprises alumina in a continuous layer ranging up to 5 micrometers and more preferably 3 micrometers in thickness. The alumina substrate surface enhances adhesion to catalyst compositions which may be deposited thereon. The presence of rare earth oxides enhances the thermal stability at the substrate surface.

The article comprises a catalyst comprising at least one catalyst layer supported on the substrate surface. The catalyst layer has an outer catalyst layer surface. The catalyst composition comprises at least one catalytically active particulate material. The catalytically active particulate material can be any suitable particulate material and is preferably a refractory oxide compound used to support a catalytically active precious metal component. The catalyst layer preferably comprises at least two and more preferably a plurality of strata. That is each catalyst layer is formed by a plurality of thin catalyst composition coatings. There is an outer catalyst layer surface which comprises agglomerates of the catalytically active particulate material. The agglomerates of the outer catalyst layer preferably have an average diameter of from about 20 to about 200 micrometers. At the outer surface, particularly when the catalyst composition is sprayed from an aqueous slurry, the agglomerates adhere to each other to form peaks. Typically and preferably, the peaks range from about 20 to about 500 micrometers. This forms a rough surface which enhances mass transfer from the gas into the catalyst layer.

In a preferred embodiment, the catalyst comprises at least one precious metal component with preferred precious metal components selected from gold, silver, platinum, palladium, rhodium, ruthenium and iridium, with more preferred precious metals components selected from at least one of platinum, palladium and rhodium. The catalyst composition additionally comprises at least one first refractory component, preferably a refractory metal oxide compound where the refractory oxide can be derived from aluminum, titanium, silicon, zirconium and cerium compounds, preferably resulting in the oxides with the preferred refractory oxides including at least one of alumina, titania, silica, zirconia and ceria. At least some of the refractory components can be used to support the precious metal components.

In a specific and preferred embodiment the catalyst additionally comprises at least one second refractory component, wherein the average particle size of the second refractory component is greater, preferably at least by about one micrometer and preferably by about three micrometers than the average particle size of the first refractory component. The second refractory component can be made of the same composition as the first refractory component.

In a more specific and preferred embodiment the article comprises the above recited metal substrate having a substrate surface comprising alumina, and a tie layer comprising a refractory metal component adjacent to the substrate surface. Preferred tie layer refractory metal components, can be compounds derived from at least one of aluminum, titanium, silicon, zirconium and/or cerium compounds. There is a catalyst comprising at least one catalyst layer supported on the substrate surface with a tie layer being between the substrate surface and the catalyst. The catalyst comprises at least one precious metal component and at least one refractory component. The average particle size of the refractory component is greater than the average particle size of the refractory metal component of the tie layer. A further embodiment includes the tie layer between the metal substrate surface and the catalyst wherein the catalyst composition additionally comprises at least one second refractory component.

The catalyst useful in the present invention can comprise a single layer comprising at least one precious metal and the first refractory component, the catalyst layer being located on the tie layer. As indicated above the particle size of refractory oxide compound of the catalyst layer is greater than that of the tie layer.

In alternate embodiments the catalyst layer can comprise at least one precious metal component and at least one first refractory component and at least one second refractory component where the average particle size of the second refractory component is greater than the average particle size of the first refractory component. In this embodiment there is optionally and preferably a tie layer. In a preferred embodiment the catalyst comprises at least one catalyst layer having two regions; a bottom region and a top region with the bottom region located between the top region and the substrate surface. The bottom region comprises a majority, 50–100 weight percent, based on the total of the first and second refractory components, of the first refractory component. The top region comprises a majority (from 50–100 by weight), based on the total weight of the first and second refractory components, of the second refractory component. As indicated above the average particle size of the second refractory component is greater than the average particle size of the first refractory component. In accordance with the process of the present invention the first and second refractory components in one layer having top region and bottom region can be separated by transport diffusion resulting from the different particle size and characteristics including surface area of the refractory component particles. In specific and preferred embodiments the catalyst comprises at least one first precious metal component in the bottom region and at least one second precious metal component in the top region.

Alternatively, the catalyst can comprise two layers; a bottom layer and a top layer with the bottom layer located between the top layer and the substrate surface or tie layer supported on the substrate surface. The bottom layer comprises from 50–100 percent, based on the total of the first and second refractory components, of the first refractory component, and the top layer comprises from 50–100 weight percent, based on the total of the first and second refractory components, of the second refractory component. There can be at least one first precious metal component in the bottom layer and at least one second precious metal component in the top layer.

In specific and preferred embodiments the substrate support surface is a rough surface which can be made rough by suitable means such as sandblasting or chemical etching. A preferred rough surface is made by sandblasting a steel surface using 30 to 100 mesh alumina until the surface has a uniform, dull appearance. The roughened surface provides enhanced adhesion between the substrate surface and the bottom catalyst layer and/or tie layer.

A preferred article of the present invention is a plate having a roughened surface comprising alumina. The alumina surface can be made by calcining the metal plate which contains up to 15 percent aluminum. The preferred temperature at which the plate is calcined is from 800 to 1150° C. for from 0.5 to about 10 hours. The optional tie layer can be a refractory oxide material, preferably alumina, which is supported on the substrate surface which is preferably roughened. The alumina at the surface of the metal plate increases adhesion between the tie composition and the metal substrate. The catalyst can be applied directly to the alumina substrate surface or to the tie layer supported on the alumina substrate surface. The tie layer is preferred since it insulates the metal substrate surface from the catalyst layer and keeps the metal cool. This is important because the reactions at the catalytic layer(s) can be exothermic and heat the metal causing a loss of adhesion between the metal and the catalyst or tie layer interfaces and separate.

The tie layer comprises a refractory metal compound, preferably a refractory metal oxide, in the substantial absence of catalytically active materials such as precious metal catalysts. It is recognized that there may be migration of some catalytically active materials from the catalyst layer into the tie layer. For the purpose of the present invention amounts of a precious metal attributable to such migration are considered within the definition of the tie layer as being a refractory metal oxide composition in the absence of a precious metal catalyst. The tie layer is preferably less than 100 micrometers and typically from 30–60 micrometers in thickness. The particle size of the refractory oxide materials in the tie layer is preferably less than about 5 micrometers in average diameter.

Supported directly on the alumina of the metal substrate surface or on the tie layer can be at least one catalyst layer. The catalyst layer(s) is preferably from in the range of from 20–300 micrometers in thickness. The size refractory component particles of the catalyst layer preferably are 90 percent within 5–20 micrometers in diameter. Where there are two layers or regions, a bottom layer or region has refractory component particles of a size preferably having 90 percent within 5–10 micrometers in diameter, and a top layer or region, has the particle size of the the refractory component top layer or top region preferably from 10–15 micrometers in diameter with the proviso that average particle size in the top layer or region is greater than that in the bottom layer or region.

The tie coat, in catalyst layers, can be applied by any convenient method including dipping, spraying, brushing or various depositions such as thermal deposition methods. The particle size can be measured using a Horiba particle size of the refractory oxide materials can be made using suitable mills or grinders. The particle size of the refractory component is not significantly affected by materials, such as precious metal supported thereon.

The article of the present invention, therefore, has a structure which results in adherence of a catalyst layer to a metal substrate. This adherence has been found to be maintained in an exhaust gas environment where elevated temperatures and a variety of chemicals are encountered. The structure of at least one catalyst layer can contain different particle size refractory components with the larger particle size toward the outer catalyst surface layer and smaller particle size components toward the substrate surface. This enhances mass transfer into the outer layers and helps to enable the catalytic reaction to take place in the region toward the outer catalyst layer surface. Since the oxidation of carbon monoxide and hydrocarbon is an exothermic reaction, this structure results in the reaction taking place away from the metal substrate surface interface and helps to preserve the adhesion between the metal substrate and the catalyst layer. In accordance with a preferred method of the present invention, the catalyst composition can be deposited in a manner such as spraying by which the particles can agglomerate. The agglomerates can adhere to each other to form a somewhat open and porous structure. It has been found that this structure results in a rough outer catalyst layer surface which may have peaks from about 20 to about 500 micrometers which enhances mass transfer from the gas stream into the catalyst layer. Additionally, by applying thin layers or strata to form a catalyst layer, the porosity of the layer is achieved by particle-to-particle porosity as well as porosity between the agglomerates of particles.

The mass transfer resulting in improved catalytic activity is enhanced by using relatively high surface area refractory oxide components, by the porosity between adjacent particles and by the porosity between agglomerates. As the catalytic activity is increased, the amount of catalytically active materials such as precious metals can be reduced. The high activity catalyzed metal plates have been found to be effective in catalyzing various elements in fossil fuel engine exhaust streams which produce hydrocarbons and carbon monoxides as well as reducing nitrogen oxides.

In a specific embodiment of the article of the present invention, the refractory component has a particle size gradient with larger particles of refractory compounds at the top catalytic layer proceeding through succeeding catalytic layers and tie layer to the metal substrate. Where there is a catalytic layer and a tie layer the catalyst layer has a greater particle size refractory oxide than the tie layer. Where there are more than one catalytic layers the top catalytic layer has the greatest particle size refractory component particles with succeeding layers having smaller particle size refractory component than the bottom layer which, in turn, has a greater particle size than the tie layer where one is present. The particle size gradient from large to small going toward the substrate has been found to result in improved adhesion at exhaust space velocities of 50,000–10,000,000 reciprocal hours, and more typically 100,000 to 1,000,000. It is believed that the particle size gradient results from larger pores at the upper layers where the particle size is larger. The gradient in particle size as well as the rough outer catalyst surface layer structure resulting from the agglomerates is believed to improve the poison resistance of the catalyst layer in exhaust environments such as those found in small fossil fueled engines. The larger pores prevents poison from coating the catalyst surface where the larger particle size refractory are located. Additionally, the larger pores permit the gaseous pollutants to more easily diffuse in through the top layer of catalyst and into a second catalyst layer. The small particle size of the tie layer restricts reactive species from penetrating to the metal surface and improves thermal stability of the whole catalytic metal place structure..

In addition to the particle size gradient resulting in particle to particle porosity and the use of different layers having different size refractory component particles, porosity can also be controlled by the porosity within the particles as well as by agglomeration as the composition is applied to the metal substrate. For example, where layers applied by rolling or brushing compositions containing the refractory particles onto the metal substrate, the particles are applied in a relatively uniform manner with regard to particle location. However, it has been found that where the composition is sprayed onto the substrate, the particles of refractory components can agglomerate as illustrated in the accompanying Figures. Accordingly, in these layers there is porosity resulting from space between particles and, additionally, from space between agglomerates of particles. While porosity gradients useful in the present invention can take advantage of these different approaches to affecting the porosity gradients, including particle porosity, particle to particle porosity, agglomerate to agglomerate porosity and layer to layer differences, a significant parameter is the refractory compound particle size to informing the particle size gradient as recited.

The use of controlled porosity of the catalyst has permits effective catalytic treatment of engine exhaust gases having a velocity component which impacts normally to the catalyst surface. Additionally, the catalytic plates of the present invention are effective for treating gases in turbulent flow as opposed to laminas flow and developing laminas flow in flow-through honeycomb monoliths. The muffler design for use in small engines incorporates the use of baffles or plates on which the gas flow can impact. The momentum of the gaseous components can then pass through the larger surface porosity into the catalyst for oxidation of such pollutants as carbon monoxide and hydrocarbons and reduction of pollutants such as nitrogen oxides. This is different than the design for typical monolithic flowthrough honeycomb designs where the gases are directed through and parallel to honeycomb channels.

A useful catalyst to treat small engine exhaust comprise a catalyst comprising two regions or layers. The bottom layer preferably comprises a first precious metal compound comprising at least one of platinum, palladium and rhodium compounds, a first refractory oxide compound which is used as a support for the first precious metal compounds, and a rare earth metal such as ceria or ceria compound such as ceria stabilized zirconia and the top layer comprises a precious metal such as palladium, a second refractory oxide compound which is used as a support for the second precious metal compounds, an alkaline metal and a rare earth such as lanthanum and neodymium. The refractory compound of the bottom layer is preferably alumina having-a particle size of more than 90 percent of the particles being from 5–7 micrometers and a surface area of 10–300, preferably 100–200 $m^2/g$. The top layer comprises at least one second precious metal comprising at least one of platinum, palladium and rhodium compounds, and at least one second refractory oxide compound having 90 percent of the particles from about 10–12 micrometers in a surface area of 10 to 300, preferably 100–200 $m^2/g$. Such a material has been shown to provide three-way catalytic activity for gaseous components of small engine exhaust including carbon monoxide, hydrocarbons and the reduction of nitrogen oxides. The catalyst compositions of the present invention can include different stabilizing materials and additives such as sulfide suppressants.

The present invention additionally includes articles such as catalyzed plates which are particularly useful in small engine applications of the type recited in the Background of the Invention. For the purpose of the present invention, small engines can include two to four cycle engines having a displacement up to about 50 cubic centimeters and typically 25 to 40 cubic centimeters. Useful and preferred articles are screens, baffles including perforated and/or corrugated baffles located in the exhaust stream path in the muffler. Alternatively, the present invention can include coated parts of the exhaust system such as internal parts of the exhaust system including surfaces in the exhaust manifold, exhaust pipes and internal walls and parts of the muffler. The plates of the present invention can be used in a variety of processes to catalyze reactions and gas streams and are particularly useful in treatment of engine exhaust gas streams. Finally, the present invention includes articles of manufacture which comprise an engine, and an exhaust system connected to the engine, wherein the exhaust system comprises a metal substrate and catalyst as recited above.

The present invention uses a high temperature stabilized catalytic component supported on a metal substrate of an exhaust system for the purpose of removing pollutants such as carbon monoxide, hydrocarbon and NOx. A stabilized catalytic composition is preferred to avoid loss of catalytic efficiency with deterioration due to the high temperature at the exhaust of the engine. This can also result in cracking and washcoat adhesion failures. A second feature of the present invention is the application of the precatalyzed material to the surface of the metal to give tightly-bound coatings. The coating of the metal can include various treatments depending on the severity of the application. It is preferred to roughen the surface using sandblasting and optionally chemical etching. An alumina oxide sealing layer can be formed at the metal surface using a high temperature heat treatment. This requires aluminum containing metal alloy resulting in aluminum migrating to the surface to form the sealing layer. There is preferably a tie layer of a refractory oxide such as alumina to lock catalyst to the oxide layer. There can be at least one catalyst layer supported on the tie layer. The catalyst coatings and catalyzed substrates produced according to the above method have been found to be extremely resilient to thermal cycling and movement of metal due to thermal stress.

BRIEF DESCRIPTION OF THE DRAWINGS

FIGS. 9–14 are microphotographs. The "A" view is a cross-sectional view with the white layer being the metal substrate. The "B" view is the top view. Each view shows a micrometer ($\mu$) scale and a magnification by 1000 times (kx).

FIG. 15 is the original plate and FIG. 16 is the heat treated sample.

DETAILED DESCRIPTION OF THE PREFERRED EMBODIMENTS

Figure 1:
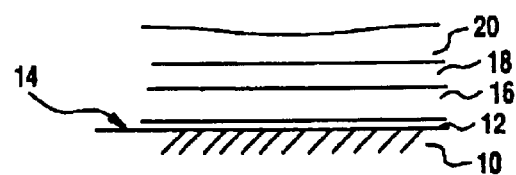
FIG. 1 is a schematic partial sectional view of the article of the present invention.

The present invention is directed to an article comprising a catalyzed metal substrate, a method of preparation of the article and a method of use of the article. The present invention additionally includes articles of manufacture incorporating the catalyzed metal substrate.

In a specific and preferred embodiment, the article comprises a metal substrate when the metal comprises iron and up to 20.0, preferably 0.5 to 10.0 and more preferably 1.0 to 5.0 weight percent aluminum and has a substrate surface comprising alumina.

The metal layer support surface of the article of the present invention is preferably rough. By rough, it is meant that the surface has been treated by surface roughening methods such as sand blasting or chemical etching to have uneven having peaks and depressions. A preferred rough surface is made by sandblasting a steel surface using 30 to 100 mesh alumina until the surface has a uniform, dull appearance.

There is a catalyst comprising at least one catalytic layer supported on the substrate surface. The catalyst comprises at least one precious metal component and at least one refractory component on which the precious metal can be supported. The refractory component is also referred to as a refractory support. In specific embodiments, there is at least one second refractory component where the average particle size of the second refractory component is greater than the average particle size of the first refractory component. Preferably, there is a tie layer comprising of refractory oxide metal compound, most preferable alumina, adjacent to the substrate surface and between the substrate surface and the catalyst. The catalyst can comprise one or more layers.

A preferred embodiment comprises at least one catalytic layer having two regions, a bottom region and a top region with the bottom region located between the top region and the substrate surface. The bottom region preferably comprises a majority and preferably from 50 to 100 percent of the first refractory component based on the total weight of the first and second refractory components while the top region comprises a majority, preferably 50 to 100 weight percent of the second refractory component based on the total of the first and second support components. There is preferably at least one precious metal component and more preferably at least one first precious metal component supported on at least one first refractory component and at least one second precious metal component supported on the second refractory component with the first metal component located substantially in the bottom region and the second refractory component located substantially in the top region. A useful method of preparation of a layer comprising a bottom region and top region and preferred compositions are disclosed in U.S. Ser. No. 08/506,480 filed Sep. 4, 1996 and entitled, "Catalyst Composition" and herein incorporated by reference.

Alternatively, rather than using at least one layer having separate regions, the article comprises at least two layers including a bottom layer and a top layer. Where there are two layers there is 50 to 100 weight percent of the first refractory component located in the bottom layer and 50 to 100 percent of the second refractory component located in the top layer. As above, there is at least one precious metal component and preferably at least one first precious metal component located on the first refractory component and substantially in the bottom layer and at least one second precious metal component located on the second refractory component and substantially located in the top layer.

In accordance with the present invention, the tie layer is made of a tie layer composition comprising a refractory metal compound. The refractory metal compound is preferably a particulate compound, preferably a refractory metal compound having a particle size less than that of the refractory component of the catalyst layer, and preferably has 90% of the particles less than about 5 micrometers.

The catalyst material comprises a first refractory support component, preferably a refractory oxide, wherein the average particle size of the first support component is greater than the particle size of the refractory metal compound of the tie layer and is preferably in the range of 90% of the particles being from about 5 to about 20, and preferably 5 to 15 micrometers in diameter. Where there are two or more catalytic layers, each succeeding catalytic layer preferable has comprises refractory support component having a greater average particle size than the preceding layer on which it is supported. Therefore, where there are two catalytic layers or one catalytic layer having two regions, the first or bottom layer or region comprises a majority of at least one first refractory component, preferably refractory, oxide compound having a particle size of 90 percent of the particles being from 5 to about 9 micrometers, and the second or top layer or region comprises a majority of at least one second refractory component, preferably a refractory oxide, particles having an average particle size of 90 percent of the particles being from about 9 to about 15 micrometers.

In a most preferred embodiments of the present invention, the metal substrate comprises a metal surface on which there is located an alumina surface layer. Preferably, the metal is an iron based metal alloy, most preferably steel, comprising chromium and up to 20, preferably up from 0.1 to 15 and more preferably 1 to 8 percent and most preferably from 1.0 to 5 percent aluminum. The metal substrate can be calcined at a suitable temperature, preferably from about 800 to about 1100° C. for a sufficient time, typically from 0.5 to about 10 hours and preferably 0.5 to 3 hours and most preferably about 1 to 2 hours to form a thin alumina layer to form on the metal surface. This layer improves the adhesion between the metal surface and at least one catalyst layer which comprises a refractory oxide component. In preferred embodiments the alumina layer results in having an improved adhesion between the metal surface, and the tie layer which in turn adheres to at least one catalytic layer. This alumina layer is derived from oxidized aluminum from the metal substrate and can be referred to as the alumina surface layer. Alternatively, the aluminum or rare earth metal can be applied by plating or cladding and calcined to form the oxide.

FIG. 1 illustrates a schematic drawing of a preferred embodiment of the article of the present invention. Metal substrate 10 has a substrate surface 12 on which there is an alumina layer 14. There is a tie layer 16 supported on the alumina layer 14 and at least one catalytic layer 18 supported on tie layer 16. The article of the present invention such as illustrated in FIG. 1 results in a stable, durable catalytic coating on a metal plate with excellent adhesion between the various layers. The article maintains durability, catalytic stability and resists being poisoned in the hostile environment of an engine exhaust stream. Following is a detailed description of the various components which can be used to make up the article of the present invention.

The metal substrate is preferably an iron based metal alloy, most preferably a steel alloy, comprising iron and chromium and optionally carbon, silica and minor amounts of manganese and preferably from 0.1 to 20 percent aluminum. Particularly preferred iron alloys or stainless steel alloys include but are not limited to stainless steels comprising from 1 to about 20 percent aluminum and about one to about 25 percent chromium and can be selected from aged hardenable stainless steel such as type 17-7 PH, PH 15-7 Mo, ferritic stainless steels including aluminum such as AISI type 405, and specialty stainless steel types such as 18 SR, and Hastalloy grades containing aluminum. The metal substrate can be the structural surface defining a pathway for the gas to be treated such as the surface defining the interior of an exhaust manifold, the interior surfaces of exhaust gas conduits and interior surfaces of a muffler. Preferably the metal substrate is in the form of a metal plate which is structurally self-supporting having a thickness of at least about 5 mils (0.005 inches). Preferred plates are at least 15 mils in thickness with a most preferred plate being from 25–40 mils in thickness. Most preferred alloys are made of Hastalloy and Faecralloy. The plate thickness is approximately 30 mils thick and the preferred alloy contains at least about 1 percent aluminum up to 20 percent chromium and optionally and preferably up to about 0.5 percent cerium.

In addition to iron, such alloys may contain one or more of nickel, chromium, tungsten and aluminum, and the total of these metals may advantageously comprise at least about 15 weight percent of the alloy, for instance, about 10 to 25 weight percent of chromium, about 1 to 8 weight percent of aluminum and 0 to about 20 weight percent of nickel. The preferred alloys may contain small or trace amounts of one or more other metals such as molybdenum, copper, silicon, niobium, titanium and the like. The surfaces of the metal carriers may be oxidized at elevated temperatures, e.g., at least about 800° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier. Preferably the metal substrate surface comprises an alumina layer. The alumina layer can be formed by calcining the aluminum containing metal substrate at from about 800–1150° C. and preferably about 900–1050° C. for sufficient time to form alumina and for the alumina to diffuse to the surface. The alumina layer on the substrate surface is preferably a continuous layer.

In accordance with the present invention the metal surface is preferably roughened by suitable means, such as sandblasting or chemical treatment such as by etching prior to calcining. Sandblasting can be conducted using 30–100 mesh alumina. Chemical etching can be conducted using an acid such as nitric acid, hydrochloric acid or a combination thereof. The surface is roughened to improve adhesion of the tie layer or catalyst layer to the substrate surface. The roughness of the surface can be indicated by peaks and troughs in the surface as shown in FIG. 10. A preferred rough surface is made by sandblasting a steel surface using 30 to 100 mesh alumina until the surface has a uniform, dull appearance.

Figure 5:
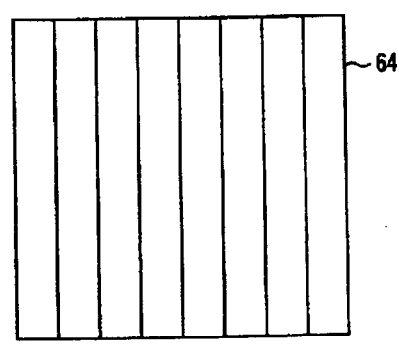
FIGS. 5 and 5A shows a catalyzed, corrugated metal plate of the present invention.
Figure 6:
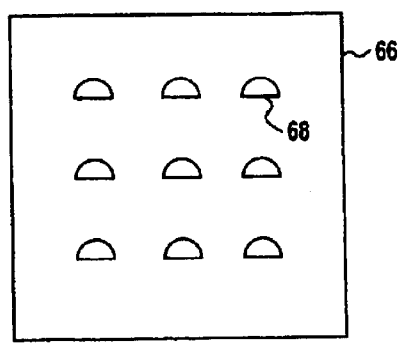
FIGS. 6 and 6A shows a catalyzed plate with punched-in slots.
Figure 6A:
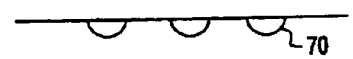
Figure 7:
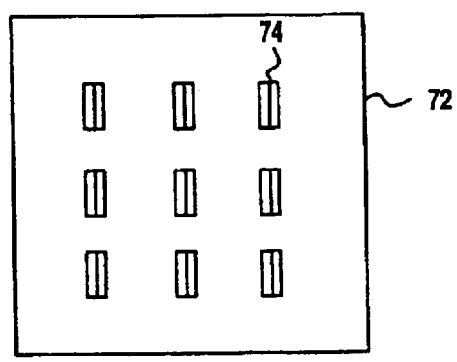
FIGS. 7 and 7A shows a catalyzed plate where holes are punched into the plate and left as mini-louvers.
Figure 8:
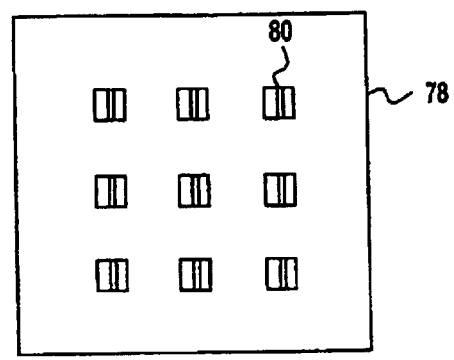
FIGS. 8 and 8A illustrate an alternate embodiment of FIGS. 7 and 7A.

Substrates can have planar or nonplanar surfaces. Useful nonplanar surfaces include corrugated surfaces (FIG. 5) which improve gas mixing by creating more turbulent flow and improving the gas diffusion rate and thus increase activities. As illustrated in FIGS. 6–8 these goals can also be enhanced in perforated plates by using slots or louvers wherein the portion of the plate adjacent to the hole or slot is pushed out in three dimensions as a louver to try to increase the turbulence of the gas flow.

Supported on the substrate surface, preferably being an alumina substrate surface, is a tie coat layer comprising a tie coat composition. The tie layer is applied to the substrate surface. The tie coat composition comprises a refractory compound, preferably an oxide and most preferably alumina. The tie coat composition is preferably a composition having substantially no catalytic activity. Any catalytic activity resulting from diffusion of catalyst from a catalytic layer supported on the tie coat is considered to be incidental. The tie coat can be as thick as necessary to achieve adhesion between the substrate surface and the catalyst layer supported on the tie coat. Preferably the tie coat is up to about 100 micrometers in thickness with a preferred tie coat thickness being from 20 to about 75 micrometers and most preferably from about 30 to 60 micrometers. The tie coat preferably comprises refractory compounds with the most preferred compounds including oxides of one or more of aluminum, titanium, silicon, zirconium, cerium and other rare earth metal compounds with alumina being the most preferred tie coat compound. The tie coat compound preferably has a particle size where 90 percent of the particles are less than about 5 micrometers in diameter.

Supported on the tie coat is the catalyst. The catalyst is preferably present as a catalyst layer located on the substrate surface with a tie layer preferably located between the substrate surface and the catalyst. The preferred catalyst comprises at least one precious metal component and at least one first refractory component supporting the precious metal component. For the purpose of the present invention the precious metal component can include gold, silver, platinum, palladium, iridium, ruthenium and rhodium or mixtures thereof. Precious metal component can be in metallic form or an oxide form. The refractory component is preferably a refractory oxide which can include compound derived from aluminum, titanium, silicon, zirconium and can be used in combination with various rare earth compounds such as compounds derived from cerium, lanthanum, neodymium and praseodymium. Preferably the refractory compounds can be applied in soluble form or in bulk slurry form. The refractory compounds which are present may be supporting precious metal components or may be present and separate from precious metal components. The preferred refractory oxide particulate compounds of the catalyst have a particle size larger than the refractory oxide particles of the tie layer where a tie layer is present. It is preferred that the catalyst layer comprise refractory oxide particles where 90 percent of the particles are from about 5 to about 20 micrometers in diameter. Accordingly, the structure of the article has a top catalyst layer having larger refractory oxide particle size containing layer than the tie layer, followed by a continuous alumina substrate layer and finally the metallic substrate.

The present invention includes a method which comprises forming a substrate surface comprising alumina, most preferably derived from aluminum in the metal substrate, on a metal substrate which preferably comprises iron and up to about 15 weight percent aluminum. Preferably the surface is roughened by sandblasting or chemical treatment such as acid etching with nitric and/or hydrochloric acid. A catalyst composition can be formed and applied to the substrate surface. A catalyst composition can be any of the compositions recited in the Background of the Invention with the proviso that where there is a tie layer the catalyst composition preferably comprises at least one first refractory component with the average particle size of the first refractory component being greater than the average particle size of the refractory metal compound of the tie layer as recited above. Where there is more than one layer of catalyst or more than one region of catalyst, the proviso is that if there is a tie layer the catalyst layer adjacent to the tie layer preferably comprises a first refractory component having a particle size which is greater than the particle size of the refractory metal compound of the tie layer. Where the first and second components of a catalyst having two regions, a bottom region and a top region or two layers, a bottom layer and a top layer, the average particle size of the second refractory component is preferably greater than the average particle size of the first refractory component. A particularly preferred and useful composition wherein there is one layer with two regions, a bottom region and a top region, is disclosed in U.S. Ser. No. 08/706,480. A useful one and two layer catalyst constructions are disclosed in the following publications: International Application Nos. WO95/00235, WO95/35152, U.S. Ser. No. 08/722,761, U.S. Pat. Nos. 5,254,519, 5,212,142, 5,139,992, 5,130,109, 5,128,306, 5,057,483, 4,714,694, 4,678,770, 4,675,308, all hereby incorporated by reference.

In specific and preferred embodiments the catalyst layer can be made in accordance with the method of U.S. Ser. No. 08/706,480 herein incorporated by reference. Such a layer will comprise at least one first refractory component and at least second refractory component. There can be at least one precious metal component in the layer. The average particle size of the second refractory component is greater than the average particle size of the first refractory component. As indicated above the refractory components are preferably refractory oxide components. When the composition is applied, the layer results in two regions; a bottom region and a top region with the bottom region located between the top region and the substrate surface. The majority of, preferably 50–100 percent, based on the total of the first and second refractory components, of the first support component is located in the bottom region while a majority, from 50–100 weight percent of the second refractory component based on the total of the first and second refractory components is located in the top region. One or both of the refractory components may be supporting at least one precious metal component. The first refractory component is preferably a refractory oxide having a particle size greater than that of a tie layer where a tie layer, is present and preferably ranging from 90 percent of the particles being from 5–10 micrometers in diameter. The second refractory component preferably comprises larger particles with 90 percent of the particles being from about 10–15 micrometers in diameter where in the average particle size of the second refractory component is greater than the average particle size of the first support component. In accordance with this embodiment of the present invention the outer most surface of the structure comprises the largest particle size refractory components in the top region followed by a bottom region having smaller particle size first refractory components which can be followed by an optional tie layer having yet smaller particle size refractory oxide components.

Yet, in another embodiment, as shown in FIG. 1 the article comprises at least two layers; a bottom layer 18 and a top layer 20. There can optionally be a tie layer 16 supported on substrate 10 and an alumina layer 14 on the substrate surface 12. Preferably the alumina layer is a continuous layer formed by calcination of an aluminum contained in substrate metal composition.

In the latter embodiment, the bottom layer 18 is located between the top layer 20 and substrate surface 12 or tie layer 16 and comprises from a majority, 50–100 weight percent, based on the total of the first and second refractory components, of the first refractory component and the top layer comprises a majority, preferably from 50–100 weight percent, based on the total of the first and second refractory components, of the second refractory component. The particle size of the first and second refractory components are the same as recited above. In accordance with this embodiment the bottom layer is preferably from 20–150 micrometers in thickness and the total thickness of the first and bottom and top layers is from 20–300 micrometers in thickness. In this embodiment the too layer comprises a majority and substantially all of the second refractory component followed by the bottom layer which comprises a majority, and substantially all of the first refractory component. Preferably, the bottom layer is supported on the optional tie layer which comprises a refractory compound which has particle size smaller than the first refractory components in the first layer which in turn is supported on the continuous alumina substrate surface layer.

In accordance with the method of the present invention a metal substrate, preferably a plate comprising an alloy of iron and aluminum initially has the substrate surface roughened, preferably by sandblasting. The roughened surface is then calcined at approximately 800–1000° C. for from 0.5 to 10 hours to result in aluminum from the metal alloy forming an alumina layer at the substrate surface. Preferably a tie coat is applied to the substrate surface and calcined at from 400–700° C. for from 0.5.to 10 hours, and preferably 0.5 to 3 hours with the most preferred calcination being conducted at about 500–600° C. for from about 1 to about 3 hours. At least one catalyst layer is applied to the tie coat. After each application of a catalyst layer, the catalyst layer is calcined under the conditions recited for calcination of the tie coat.

The article of the present invention provides a useful catalytic surface which can catalyze reactions and gas streams which contact the catalyst layers. This is the case even where the gas stream has a normal velocity component to the surface of the substrate. The architecture of the catalyzed metal plate of the present invention is designed to have a rough outer surface where roughness and porosity can be attained by spraying the outer surface to result in agglomerates causing surface roughness. As indicated, such surface roughness can be characterized as resulting from agglomerates at the outer surface which adhere to each other to form peaks from about 20 to about 500 micrometers. This surface roughness can help trip a gas boundary layer or to enhance contact gas in turbulent flow. Additionally, the design of the catalyst on the metal plate results in sequential layers having larger particle size refractory compounds at the surface and succeedingly decreasing particle size refractory compounds until the continuous alumina layer is encountered at the substrate surface. The larger particle size refractory compounds of a layer results in a greater amount of porosity than smaller particle sizes. This is an advantage where the gas stream contains poisonous contaminants. Such contaminants initially encounter a porous large particle size top catalytic layer. It is very difficult for the contaminants to form a continuous poisonous blanket on such a layer compared to a layer having smaller particle size refractory compounds and having the effect of being more continuous and more easily coated with a poisonous layer.

Additionally, the larger particles refractory compounds at the surface with subsequent layers having smaller particle size refractory compounds with the attendant reduction and porosity permits the gases to initially enter into the catalyst layer and have more restricted passage as they move toward the metal plate. This enables the gas to have a controlled amount of residence time depending on layer thickness and particle size. By reducing the particle size as the gas moves toward the metal plate, decreases the amount of catalytic reaction closer to the metal substrate surface. As a result, the increase in temperature resulting during exothermic reactions is insulated by the tie layer and the smaller particulate sizes in the bottom layer resulting in more thermal stability of the structure keeping the structure cool. The use of succeeding refractory compound layers has been found to increase the adhesion of the catalyst to the tie layer and alumina surface layer to the metal substrate during hostile conditions such as found in exhaust streams of engines where cyclical large changes in temperature are experienced.

The catalyst compositions of the present invention can contain precious metal based catalyst including platinum group metals base metal components, rare earth metal components and refractory metal components including refractory compounds. Useful precious metal components include gold, silver and platinum group metals including platinum, palladium, rhodium, ruthenium and iridium compounds. The composition comprises refractory oxide materials which can be nominally referred to as support materials since they can support various catalyst composition components such as precious metal compounds. The catalyst can additionally comprise stabilizing materials including materials derived from zirconium, titanium, alkaline earth metal oxides such as barium, calcium and strontium or rare earth oxides such as ceria, lanthanum, neodymium, praseodymium and ceria. The composition can contain oxygen storage components based on cerium and praseodymium compounds as well. Additionally, the composition can contain base metal compounds such as base metal oxides based on iron and nickel useful to suppress sulfide formulation. Useful catalyst compositions can include any of the catalysts recited in the Background of the Invention.

A useful catalyst composition of the present invention comprises at least one first refractory component, at least one first precious metal component, at least one second refractory component and at least one second precious metal component. The total amount of the first precious metal component comprises from 1 to 99, typically from 5 to 95, more typically from 20 to 80, yet more typically from 25 to 75 weight percent based on the total of the first and second precious metal components. The average particle size of the second refractory component is greater than the average particle size of the first refractory component. The average particle size can be measured by any suitable means. The particle size can be measured using a Horiba or a Brinman Particle Size Analyzer. The average particle size is reported as a percent of particles below a certain measured diameter. The average particle size of the first component preferably is 50% and more preferably 90% of the particles below 10 micrometers and more preferably below 8 micrometers. The average particle size of the second refractory component is preferably 50% and more preferably 80% of the particles having a particle size below, 30 and more preferably 15 micrometers. The average particle size of the second refractory component is at least about 1, preferably at least about 2 and more preferably at least about 3 micrometers greater than the average particle size of the first refractory component. Preferably, the average particle size of the second refractory component is from 2 to 10 micrometers and more preferably 3 to 8 micrometers greater than the average particle size of the first support.

The use of precious metal supported on the refractory components of different particle size results in an particle diffusion phenomena during coating of a layer of slurry of the catalyst composition. A majority of the smaller refractory components and material located on the smaller refractory components diffuse to the bottom region of a catalyst layer supported on a substrate resulting in a greater concentration of the smaller first particles in the bottom half of the layer than the larger second particles of refractory compounds, a majority of which diffuses to the top region of the catalyst layer. This results in a concentration gradient across the thickness or a coated catalyst layer wherein there are more smaller size particles of supported material in the bottom half of the layer and more larger size particles of refractory material containing precious metal in the top half of a layer. An advantage of using the different particle size supports is that different materials on different size supports can be segregated from each other by being on different supports, and can further be segregated by particle distribution due to diffusion in the layer of the catalyst composition which is deposited from a slurry.

In addition to controlling porosity in a layer, different precious metals can be segregated from each other. For example, the catalytic activity of a catalyst containing both palladium and rhodium in close proximity can be reduced by their interaction. In accordance with the prior art, these precious metals can be separated into different layers or on different support materials to avoid this effect. However, in accordance with the composition of the present invention, different precious metals can be located on different refractory compounds and the different refractory compounds such as the first and second refractory compounds can be of different particle size or density so that there is a certain amount of diffusional separation of the particles within a layer deposited from a slurry. Accordingly, in a preferred embodiment, at least one of the first precious metal components and at least one of the second precious metal components comprise at least one precious metal not present in the other precious metal component. Therefore, the first precious metal component can comprise palladium and the second precious metal component can comprise rhodium.

The first and second supports can be the same or different and are preferably selected from the group from refractory oxide materials which more preferably include silica, alumina and titania compounds. Particularly preferred supports are activated, high surface compounds selected from the group consisting of alumina, silica, silica-alumina, alumina-silicates, alumina-zirconia, alumina-chromia and alumina-ceria. The catalyst composition can further comprise a nickel or iron component.

Other materials which can be included in the catalyst composition include at least one first rare earth metal, an oxygen storage composition, and optionally at least one stabilizer and optionally a zirconia compound. The first rare earth metal compound can be selected from the group consisting of lanthanum components and neodymium components. The oxygen storage composition can be in bulk form and preferably comprises at least one of cerium and praseodymium compounds. Useful oxygen storage compositions can comprise a refractory oxide in combination with the oxygen storage component such as a composition comprising ceria as an oxygen storage component and zirconia as a refractory oxide with a preferred ceria zirconia compound being a co-formed composite comprising up to 40% by weight of ceria.

The stabilizer can be any useful stabilizer for TWC catalyst compositions with preferred stabilizers including alkaline earth metal components derived from a metal selected from the group consisting of magnesium, barium, calcium and strontium. The catalyst composition preferably comprises a zirconia compound and a rare earth oxide selected from lanthana and neodymia.

A preferred catalyst composition comprises, based on catalyst loading on a substrate, from about 0.01 to 25 and preferably 0.05 to 5 mg/in$^2$ of at least one first precious metal component, from about 0.05 to about 3.0 g/in$^2$ of the first refractory compound, from about 0 to about 25 g/in$^2$ of at least one second precious metal component, from about 0.05 g/in$^2$ to about 3.0 g/in$^2$ of the second refractory compound, from about 0.0001 to about 0.1 g/in$^2$ of at least one alkaline earth metal components, from about 0.0001 to about 0.3 g/in$^2$ of the zirconium component, and from about 0.0001 to about 0.5 g/in$^2$ of at least one rare earth metal component selected from the group consisting of ceria metal components, lanthanum metal components and neodymium metal components. The composition can additionally comprise about 0.0 to 0.1 g/in$^2$ of a nickel compound. Additionally, the composition can comprise from 0.01 g/in$^2$ to about 1.0 g/in$^2$ of a particulate composite of zirconia and ceria and optionally, a rare earth component selected from lanthanum and neodymia. The particular zirconia and ceria compound comprises from 50 to 90 weight percent of zirconia and 10 to 40 weight percent ceria with-up to 10 weight percent of a rare earth oxide selected from the group consisting of lanthana, neodymia, yttria and mixtures thereof.

The method of preparing the composition includes the steps of forming a complete slurry of a liquid vehicle and the catalyst composition where the catalyst composition comprises at least one first precious metal component supported on at least one first refractory compound and at least one second precious metal component supported on at least one second refractory compound, where the total amount of first precious metal component relative to the second is as recited above and the average particle size of the second refractory compound is greater than the average particle size of the first refractory compound is as recited above. In the preferred embodiment, the method further comprises the steps of forming at least one first slurry comprising at least one first precious metal component supported on at least one first refractory compound and forming a second slurry comprising at least one second precious metal component supported on at least one second refractory compound and mixing the first slurry and second slurry to make the complete slurry. The complete slurry can be deposited as a layer on the substrate. There can be more than one first slurry containing components which have a greater concentration in the bottom, and there can be more than one second slurry containing components which have a greater concentration in the upper. In this way, segregation or components with the upper and lower half (regions) of the layer can be achieved.

The method can yet further comprise the steps of fixing at least one first precious metal component on to at least one first refractory compound and/or the at least one second precious metal component on the at least one second refractory compound. The precious metal which is fixed to the support can be segregated from components which may have a negative impact on the catalytic activity of that precious metal on other supports in the composition. The fixing step can be suitable fixing steps known in the art such as chemically fixing or thermally fixing. A preferred fixing step is to thermally fix the precious metal to the refractory compound. This is preferably conducted in air at from 50° C. to about 550° C. from 0.5 to about 2.0 hours. The method can additionally comprise steps of adding additional materials to either the first slurry or the second slurry including materials such as at least one rare earth metal component, an oxygen storage component, at least one stabilizer and/or a zirconia component.

The method of the present invention can further comprise the steps of making at least one precious metal component supported on at least one first refractory compound and at least one second precious metal component supported on at least one second refractory compound. This can be accomplished by mixing a solution of at least one water-soluble first precious metal component and at least one first finely divided, high surface area, refractory oxide support which is sufficiently dry to absorb essentially all of the solution. The first precious metal is fixed to the first refractory compound to form a first frit of supported precious metal component. The first frit particle size can be reduced by suitable milling means. Similarly, the process can include the step of separately mixing a solution of at least one water soluble second precious metal component and at least one second finely divided, high surface area, refractory oxide support which is sufficiently dried to adsorb essentially all of the solution. The second precious metal can be fixed as a second refractory compound to form a second frit of supported precious metal component and the particle size of the second frit can be reduced by suitable milling means. The step of adding additional materials to the first or second slurry can be conducted by adding the materials to a slurry selected from the group comprising of a first slurry comprising the first frit or a second slurry comprising the second frit.

Finally, the method can comprise a step of coating the substrate with, the complete slurry, preferably in a manner to form a particle distribution in the supported layer wherein the smaller particles are in the bottom portion distributed in greater concentration in the bottom half of the layer and the larger particles are distributed in a greater concentration in the upper half of the layer.

The supported particles can thereby be segregated within a single layer. This enables the avoidance of deleterious interaction of supported components such as precious metals with each other and with other components which are supported on different supports. Additionally, this permits the application of the single layer which achieves the advantage of a comparable catalyst architecture having two or more layers. Multiple layers of the same or different compositions within the scope of the present invention can be applied and advantage taken of the use of the different diameter supports and segregation and distribution of materials within each separate layer.

The present invention is useful for a three-way conversion catalyst compositions or TWC's. The TWC catalyst composite of the present invention can simultaneously catalyzes the oxidation of hydrocarbons and/or carbon monoxide and the reduction of nitrogen oxides present in a gas stream.

A gas stream containing hydrocarbons, carbon monoxide and/or nitrogen oxides initially first encounters a greater amount of the supported second precious metal component which is designed to effectively reduce nitrogen oxides to nitrogen and oxidize hydrocarbons while causing some oxidation of carbon monoxide. The gas then passes to a greater amount of the supported first precious metal component designed to convert pollutants, including the oxidation of hydrocarbons and remaining carbon monoxide. The supported first precious metal half of the layer results in effective oxidation of hydrocarbons over wide temperature ranges for long periods of time. In the preferred composite the first layer comprises a catalytically effective amount of a platinum or palladium component, preferably palladium with typically 0.1 to 2 mg/in$^2$ and more typically 0.5 to 1.5 g/in$^2$ and preferably 0.5 to 1.0 mg/in$^2$ of a palladium component. Platinum can be used at from 0 to 1.0 g/in$^2$ and typically at least 0.1 g/in$^2$ and more typically 0.1 to 1.0 and more preferably from 0.1 to 0.5 mg/in$^2$ by weight of platinum component. The supported second precious metal layer preferably comprises a second rhodium component and optionally a second platinum component. The amount of rhodium component on the second support is from 0.05 to about 2, preferably from 0.1 to 1.0 mg/in$^2$. The supported second precious metal preferably contains from 50 to 100 weight percent of the rhodium component based on the total rhodium metal in the first and second layers.

The first refractory compound and second refractory compound which can be the same or different refractory compound components. The refractory compound preferably comprises a high surface area refractory oxide support. The average particle size of the second support is greater than the average particle size of the first support. For the purpose of the present invention, particle size is measured using a Horiba or a Brinkman particle size analyzer. The particle size distribution is indicated by a percent of particles having an average particle diameter less than a given number in micrometers. Typically, the particles of the first refractory compound and second refractory compound have at least 80% of the particles having an average diameter of less than about 10 micrometers and preferably the first support has 90% of the particles having an average diameter of less than 10 micrometers and the second refractory compound has at least 80% of the particles having an average diameter of less than 25 micrometers. Nominally, particles of precious metal and other components supported on a refractory compound are considered to have the same particle size as the refractory compound.

Preferably, a first refractory compound supporting a precious metal component comprises a refractory oxide such as a mixture of high surface area aluminas supporting a precious metal component comprising palladium has a preferred particle size of 90% of the particles being less than 8 to 12 microns and a second support supporting a precious metal component comprises a mixture of high surface area alumina and co-formed ceria zirconia has an average particle size of 90% of the particles being less than about 10 to 15 micrometers with the particle size of the second refractory compound being greater than the particle size of the first refractory compound.

Useful high surface area refractory compounds include one or more refractory oxides. These oxides include, for example, silica and alumina, include mixed oxide forms such as silica-alumina, aluminosilicates which may be amorphous or crystalline, alumina-zirconia, alumina-chromia, alumina-ceria and the like. The refractory compound is substantially comprised of alumina which preferably includes the members of the gamma or transitional alumina, such as gamma and eta aluminas, and, if present, a minor amount of other refractory oxide, e.g., about up to 20 weight percent. Desirably, the active alumina has a specific surface area of 60 to 350 m$^2$/g.

The preferred catalyst of this invention comprises platinum group metal components present in an amount sufficient to provide compositions having significantly enhanced catalytic activity to oxidize hydrocarbons and carbon monoxide and reduce nitrogen oxides. The location of the platinum group metal components, particularly the rhodium component and palladium component and the relative amounts of rhodium components in the respective first and second regions have been found to affect the durability of catalyst activity.

In preparing the catalyst, a precious metal component such as a platinum group metal catalytic component can be a suitable compound, and/or complex of any of the platinum group metals may be utilized to achieve dispersion of the catalytic component on the support, preferably activated alumina and/or ceria-zirconia composite support particles.

As used herein, the term "precious metal components" include gold, silver and "platinum group metal component" including the recited platinum, rhodium, platinum, ruthenium and iridium components and means any such platinum group metal compound, complex, or the like which, upon calcination or use of the catalyst decomposes or otherwise converts to a catalytically active form, usually, the metal or the metal oxide. Water soluble compounds or water dispersible compounds or complexes of one or more platinum group metal components may be utilized as long as the liquid used to impregnate or deposit the catalytic metal compounds onto the support particles does not adversely react with the catalytic metal or its compound or complex or the other components of the slurry, and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum group metals are preferred. For example, suitable compounds are chloroplatinic acid, amine solubilized platinum hydroxide such as hexahydroxymonoethanolamine complexes of platinum, rhodium chloride, rhodium nitrate, hexamine rhodium chloride, palladium nitrate or palladium chloride, etc. During the calcination step, or at least during the initial phase of use of the catalyst, such compounds are converted into a catalytically active form of the platinum group metal or a compound thereof, typically an oxide.

The catalyst composition of the present invention preferably contains an oxygen storage component which can be in bulk form or in intimate contact with the supported precious metal component, i.e., palladium and rhodium. The oxygen storage component is any such material known in the art and preferably at least one oxide of a metal selected from the group consisting of rare earth metals, most preferably a cerium or praseodymium compound with the most preferred oxygen storage component being cerium oxide (ceria).

The oxygen storage component can be included by discerning methods known in the art. Such methods can include impregnation onto the first or second support composition. The oxygen storage component can be in the form of an aqueous solution. Drying and calcining the resulted mixture in air results in an oxide of the oxygen storage component in intimate contact with the platinum group metal component. Typically, impregnation means that there is substantially sufficient liquid to fill the pores of the material being impregnated. Examples of water soluble, decomposable oxygen storage components which can be used include, but are not limited to, cerium acetate, praseodymium acetate, cerium nitrate, praseodymium nitrate, etc. U.S. Pat. No. 4,189,404 discloses the impregnation of alumina based support composition with cerium nitrate.

Alternatively, the oxygen storage composition can be in bulk form. The bulk oxygen storage composition can comprise an oxygen storage component which is preferably a cerium group component preferably ceria or praseodymia, and most preferably ceria. By bulk form it is meant that the composition comprising ceria and/or praseodymia is present as discrete particles which may be as small as 0.1 to 15 microns in diameter or smaller, as opposed to having been dispersed in solution as in the first layer. A description and the use of such bulk components is presented in U.S. Pat. No. 4,714,694, hereby incorporated by reference. As noted in U.S. Pat. No. 4,727,052, also incorporated by reference, bulk form includes oxygen storage composition particles of ceria admixed with particles of zirconia, or zirconia activated alumina. It is particularly preferred to dilute the oxygen storage component as part of an oxygen storage component composition.

The oxygen storage component composition can comprise an oxygen storage component, preferably ceria and a diluent component. The diluent component can be any suitable filler which is inert to interaction with platinum group metal components so as not to adversely affect the catalytic activity of such components. A useful diluent material is a refractory oxide with preferred refractory oxides being of the same type of materials recited below for use as catalyst supports. Most preferred is a zirconium compound with zirconia most preferred. Therefore, a preferred oxygen storage component is a ceria-zirconia composite. There can be from 1 to 99, preferably 1 to 50, more preferably 5 to 30 and most preferably 10 to 25 weight percent ceria based on the ceria and zirconia. Another preferred oxygen storage composition can comprise a composite comprising zirconia, ceria and at least one rare earth oxide. Such materials are disclosed for example in U.S. Pat. Nos. 4,624,940 and 5,057,483, hereby incorporated by reference. Particularly preferred are particles comprising greater than 50% of a zirconia-based compound and preferably from 60 to 90% of zirconia, from 10 to 30 wt. % of ceria and optionally up to 10 wt. %, and when used at least 0.1 wt. %, of a non-ceria rare earth oxide useful to stabilize the zirconia selected from the group consisting of lanthana, neodymia and yttria.

The composition optionally and preferably comprises a component which imparts stabilization. The stabilizer can be selected from the group consisting of alkaline earth metal compounds. Preferred compounds include compounds derived from metals selected from the group consisting of magnesium, barium, calcium and strontium. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. While a variety of stabilizers are disclosed, the composition of the present invention preferably use alkaline earth metal components. The alkaline earth metal components are preferably alkaline earth metal oxides. In particularly preferred compositions, it is desirable to use strontium oxide and/or barium oxide as the compound in the composition. The alkaline earth metal can be applied in a soluble form which upon calcining becomes the oxide. It is preferred that the soluble barium be provided as barium nitrite or barium hydroxide and the soluble strontium provided as strontium nitrate or acetate, all of which upon calcining become the oxides.

In other aspects of the invention, one or more modifiers may be applied to the activated alumina either before or after the alumina particles are formed into an adherent, calcined coating on the carrier substrate. (As used herein, a "precursor", whether of a thermal stabilizer, or other modifier or other component, is a compound, complex or the like which, upon calcining or upon use of the catalyst, will decompose or otherwise be converted into, respectively, a thermal stabilizer, other modifier or other component.) The presence of one or more of the metal oxide thermal stabilizers typically tends to retard the phase transition of high surface area aluminas such as gamma and eta aluminas to alpha-alumina, which is a low surface area alumina. The retardation or such phase transformations tend to prevent or reduce the occlusion of the catalytic metal component by the alumina with the consequent decrease of catalytic activity.

In the composition, the amount of thermal stabilizer combined with the alumina may be from about 0.05 to 30 weight percent, preferably from about 0.1 to 25 weight percent, based on the total weight of the combined alumina, stabilizer and catalytic metal component.

The composition can contain a compound derived from zirconium, preferably zirconium oxide. The zirconium compound can be provided as a water soluble compound such as zirconium acetate or as a relatively insoluble compound such as zirconium hydroxide. There should be an amount sufficient to enhance the stabilization and promotion of the respective compositions.

The catalyst composition preferably contains at least one promoter selected from the group consisting of lanthanum metal components and neodymium metal components with the preferred components being lanthanum oxide (lanthana) and neodymium oxide (neodymia). In a particularly preferred composition, there is lanthana and optionally a minor amount of neodymia. While these compounds are disclosed to act as stabilizers, they can also act as reaction promoters. A promoter is considered to be a material which enhances the conversion of a desired chemical to another. In a TWC the promoter enhances the catalytic conversion of carbon monoxide and hydrocarbons into water and carbon dioxide and nitrogen oxides into nitrogen and oxygen.

The lanthanum and/or neodymium are in the form of their oxides. Preferably, these compounds are initially provided in a soluble form such as an acetate, halide, nitrate, sulfate or the like to impregnate the solid components for conversion to oxides. It is preferred that in the promoter be in intimate contact with the other components in the composition including and particularly the platinum group metal.

The composition of the present invention can contain other conventional additives such as sulfide suppressants, e.g., nickel or iron components. If nickel oxide is used, an amount from about 1 to 25% by weight of the first coat can be effective, as disclosed in commonly owned Ser. No. 07/787,192, hereby incorporated by reference.

A particularly useful catalyst composition of the present invention comprises from about 0.05 to 3.0 mg/in$^2$ of a first precious metal such as a palladium component; from about 0 to 0.3 mg/in$^2$ of the first platinum component; from about 0.1 to about 2.0 g/in$^2$ of the first refractory compound, i.e., alumina; from about 0.0 to 2.0 mg/in$^2$ of a second platinum component and from about 0.001 to 1.0 mg/in$^3$ of the rhodium component as a second precious metal component and from about 0.1 g/in$^2$ to about 2.0 g/in$^2$ of the second refractory compound, i.e., alumina and ceria-zirconia component; at least about 0.01 g/in$^2$ and preferably from about 0.05 to about 1.0 g/in$^2$ of an oxygen storage component, preferably a composite of ceria and zirconia; from about 0.0001 to about 0.01 g/in$^2$ of at least one first alkaline earth metal components; from about 0.0001 to about 0.3 g/in$^2$ of a zirconium component; and from about 0.0 to about 0.05 g/in$^2$ of at least one first rare earth metal component selected from the group consisting of lanthanum metal components and neodymium metal components. The composition can further comprise from about 0 g/in$^3$ to about 0.1 g/in$^2$ of a nickel component. The particulate composite of zirconia and ceria can comprise 50 to 90 wt. % zirconia, 10 to 40 wt. % ceria and from 0 to 10 wt % rare earth oxides comprising lanthana, neodymia and mixtures thereof. Components other than the supports and precious metal components can be added to the first or second slurries.

The catalyst composition can be coated as a layer on a metal substrate generally which can comprise from about 0.1 to about 5, preferably about 0.3 to about 2 g/in$^2$ of catalytic composition based on grams of composition per square inch of the substrate surface.

The catalyst composition useful in a single layer having two regions can be made by any suitable method. A preferred method comprises mixing a first mixture of a solution of at least one water-soluble, first palladium component and optionally a first platinum component, and finely-divided, high surface area, refractory oxide which is sufficiently dry to absorb essentially all of the solution to form a first slurry. The first palladium and optionally platinum component are preferably comminuted in the first slurry. Preferably, the slurry is acidic, having a pH of less than 7 and preferably from 2 to 7. The pH is preferably lowered by the addition of an acid, preferably acetic acid to the slurry. In particularly preferred embodiments the first slurry is comminuted to result in substantially all of the solids having particle sizes of less than about 10 micrometers in average diameter. The first supported palladium component and optional platinum component in the resulting first slurry can be converted to a water insoluble form by a fixing step. The palladium and platinum components can be converted to insoluble form thermally, chemically or by calcining. The first layer can be thermally fixed in air at preferably at about 50° C. to 550° C. for from 0.5 to 2.0 hours.

A second mixture of a solution of at least one water-soluble second rhodium component and optionally at least one water-soluble platinum component, and finely-divided, high surface area, refractory oxide which is sufficiently dried to absorb essentially all of the solution is mixed. The second platinum component and second rhodium component are added to water to form a second slurry and preferably comminuted in the second slurry. Preferably, the second slurry is acidic, having a pH of less than 7 and preferably from 3 to 7. The pH is preferably lowered by the addition of an acid, preferably acidic acid to the slurry. In particularly preferred embodiments the second slurry is comminuted to result in substantially all of the solids having particle sizes of less than 15 micrometers in average diameter.

The second supported rhodium group component and second platinum component in the resulting second mixture are converted to a water insoluble form. The platinum and rhodium components can be converted to insoluble form thermally, chemically or by calcining. The second layer is preferably thermally fixed, preferably at about 50° C. to 550° C. for from 0.5 to 2.0 hours.

The first slurry containing a supported palladium component and the second slurry containing a supported rhodium component can be mixed to form a complete slurry. Additives such as oxygen storage components, stabilizers, rare earth metal components, and zirconium components and the like can be added either to the first slurry, to the second slurry or the complete slurry. Preferably the additional additives are added to the first or second slurry prior to a step of co-minuting the slurry.

Each of the first and second slurries useful for the present compositions can also be prepared by the method in disclosed in U.S. Pat. No. 4,134,860 (incorporated by reference) generally recited as follows.

A finely-divided, high surface area, refractory oxide support component is contacted with a solution of a water-soluble, catalytically-promoting metal component, preferably containing one or more platinum group metal components, to provide a mixture which is essentially devoid of free or unabsorbed liquid. The catalytically-promoting platinum group metal component of the solid, finely-divided mixture can be converted at this point in the process into an essentially water-insoluble form while the mixture remains essentially free of unabsorbed liquid. This process can be accomplished by employing a refractory oxide support, e.g., alumina, including stabilized aluminas, which is sufficiently dry to absorb essentially all of the solution containing the catalytically-promoting metal component, i.e., the amounts of the solution and the support, as well as the moisture content of the latter, are such that their mixture has an essential absence of free or unabsorbed solution when the addition of the catalytically-promoting metal component is complete. The composite remains essentially dry, i.e. it has substantially no separate or free liquid phase. During the latter process the metal component can be fixed on the support.

After the catalytically-promoting metal solution and high area refractory oxide support are combined the catalytically-promoting metal component can be fixed on the support, i.e., converted to essentially water-insoluble form, while the composite remains essentially devoid of free or unabsorbed aqueous medium. The conversion may be effected chemically, by treatment with a gas such as hydrogen sulfide or hydrogen or with a liquid such as acetic acid or other agents which may be in liquid form, especially an aqueous solution, e.g. hydrazine. The amount of liquid used, however, is not sufficient for the composite to contain any significant or substantial amount of free or unabsorbed liquid during the fixing of the catalytically-promoting metal on the support. The fixing treatment may be with a reactive gas or one which is essentially inert; for example, the fixing may be accomplished by calcining the composite in air or other gas which may be reactive with the catalytically-promoting metal component or essentially inert. The resulting insoluble or fixed catalytically-promoting metal component may be present as a sulfide, oxide, elemental metal or in other forms. When a plurality of catalytically-promoting metal components are deposited on a support, fixing may be employed after each metal component deposition or after deposition of a plurality of such metal components.

The first and second slurries containing the fixed, catalytically-promoting metal component can be comminuted as a slurry which is preferably acidic, to provide solid particles of the recited particle size. The slurries can be mixed to result in a complete slurry which can be used to coat a macrosize carrier, typically having a low surface area, and the composite is dried and may be calcined. In these catalysts the composite of the catalytically-promoting metal component and high area support exhibits strong adherence to the carrier, even when the latter is essentially non-porous as may be the case with, for example, metallic carriers, and the catalysts have very good catalytic activity and life when employed under strenuous reaction conditions. Each of the first and second slurries can be mixed to form a complete slurry and applied as a layer supported on a substrate carrier and calcined of the present invention.

The method provides compositions of uniform and certain catalytically-promoting metal content since essentially all of the platinum group metal component thereby added to the preparation system remains in the catalyst, and the compositions contain essentially the calculated amount of the active catalytically-promoting metal components. In some instances a plurality of catalytically-active metal components may be deposited simultaneously or sequentially on a given refractory oxide support. The intimate mixing of separately prepared catalytically-promoting metal component refractory oxide composites of different composition made by the procedure of this invention, enables the manufacture of a variety of catalyst whose metal content may be closely controlled and selected for particular catalytic effects. The composition may have a platinum group metal component on a portion of the refractory oxide particles, and a base metal component on a different portion of the refractory oxide particles. It is, therefore, apparent that this process is highly advantageous in that it provides catalysts which can be readily varied and closely controlled in composition.

The comminution of the first and second slurries can be accomplished in a ball mill or other suitable equipment, and the solids content of the slurry my be, for instance, about 20 to 60 weight percent, preferably about 35 to 45 weight percent. The pH of each slurry is preferably below about 6 and acidity may be supplied by the use of a minor amount of a water-soluble organic or inorganic acid or other water-soluble acidic compounds. Thus the acid employed may be hydrochloric or nitric acid, or more preferably a lower fatty acid such as acetic acid, which may be substituted with, for example, chlorine as in the case of trichloroacetic acid. The use of fatty acids may serve to minimize any loss of platinum group metal from the support.

The catalyst composition can be deposited on the metal substrate from about 2 to 30 weight percent of the coated substrate, and is preferably about 5 to 20 weight percent. The composition deposited on the substrate is generally formed as a coated layer over at least part, of the surface of the substrate. The structure may be dried and calcined, as recited above.

Alternatively, the structure of the catalyst composite of the present invention is designed wherein there is a first layer having a first layer composition and a second layer having a second layer composition. The first layer is also referred to as the bottom or inner layer and the second layer referred to as the top or outer layer. Where the exhaust gaseous emissions comprise hydrocarbons, carbon monoxide and nitrogen oxides, the gas first encounter the second or top layer. In the top layer, a supported platinum group metal composition acts to catalyze the reduction of nitrogen oxides to nitrogen and the oxidation of hydrocarbons. Upon passing through the top or second layer, the exhaust gas then contacts the first or bottom layer. In this layer, a supported platinum group metal composition acts to catalyze to oxidation of hydrocarbons and carbon monoxide. A useful two-layer catalyst structure and composition is disclosed in WO95/00235 and WO95/35152, both herein incorporated by reference.

A preferred embodiment of the present invention comprises a layered catalyst composite comprising a first layer and a second layer. The first layer comprises a first refractory component. The first layer comprises at least one first platinum group component, preferably a first palladium component and optionally, at least one first platinum group metal component other than palladium, an oxygen storage component which is preferably in intimate contact with the platinum group metal component in the first layer. Preferably the first layer additionally comprises a first zirconium component, at least one first alkaline earth metal component, and at least one first rare earth metal component selected from the group consisting of lanthanum metal components and neodymium metal components.

The second layer comprises at least one second platinum group component, preferably selected from a second palladium component and a second rhodium component and optionally, at least one second platinum group metal component other than the selected second palladium or rhodium component. Most preferably, the second platinum group component comprises rhodium and yet more preferably a mixture of rhodium and platinum. Preferably the second layer additionally comprises a second zirconium component, at least one second alkaline earth metal component, and at least one second rare earth metal component selected from the group consisting of lanthanum metal components and neodymium metal components. Preferably, each layer contains a zirconium component, at least one of the alkaline earth metal components and the rare earth component. Most preferably, each layer includes both at least one alkaline earth metal component and at least one rare earth component. The second layer optionally further comprises a second oxygen storage composition which comprises a second oxygen storage component. The second oxygen storage component and/or the second oxygen storage composition are preferably in bulk form.

Optionally the first layer can further comprise at least one additional platinum group metal component which preferably selected from the group consisting of platinum, rhodium, ruthenium, and iridium components with preferred additional first layer platinum group metal components being selected from the group consisting of platinum and rhodium and mixtures thereof.

Similarly the second layer can further comprise, in addition to a second palladium component, at least one second platinum group metal component, preferably selected from the group consisting of platinum, rhodium, ruthenium, and iridium components, with platinum and rhodium components being preferred.

Exhaust gas emissions comprising hydrocarbons, carbon monoxide and nitrogen oxides first encounter the second layer. In the preferred embodiment second platinum component and the rhodium component in the second layer is believed to catalyze the reduction of nitrogen oxides to nitrogen and the oxidation of hydrocarbons and carbon monoxide. The second layer preferably comprises a second oxygen storage composition comprising a second oxygen storage component such as rare earth oxide, preferably ceria.

Preferably, the second oxygen storage composition is in bulk form. By bulk form it is meant that the composition is in a solid, preferably fine particulate form, more preferably having a particle size distribution such that at least about 95% by weight of the particles typically have a diameter of from 0.1 to 5.0, and preferably from 0.5 to 3 micrometers. Reference to the discussion of bulk particles is made to U.S. Pat. Nos. 4,714,694 and 5,057,483 both hereby incorporated by reference.

Optionally, the first and/or the second layers comprise an oxygen storage composite in particulate form the oxygen storage composite preferably comprises ceria and zirconia and optionally and yet more preferably a rare earth component selected from the group consisting of lanthanum and neodymium components and mixtures thereof. A particularly preferred composite comprises ceria, neodymia, and zirconia. Preferably there is from 60 to 90 weight percent zirconia, 10 to 30 weight percent ceria, and up to 10 weight percent neodymia. The ceria in the composite not only behaves as an oxygen storage component enhancing oxidation of carbon monoxide and the reduction of nitric oxides but also helps to stabilize the zirconia by preventing it from undergoing undesirable phase transformation. As indicated above, the specific and preferred composition of the present invention is one wherein the first and second layers require respectively a first palladium component and a second palladium component.

As recited above, preferred first and second refractory components can be the same or different compounds selected from the group consisting of silica, alumina, and titania compounds. More preferably the first and second supports are activated compounds selected from the group consisting of alumina, silica, silica-alumina, aluminosilicates, alumina-zirconia, alumina-chromia, and alumina-ceria. First and second supports are most preferably activated alumina.

Alkaline earth metals are believed to stabilize the first and second layer compositions, and rare earth metal components selected from lanthanum and neodymium components are believed to promote the catalytic activity of the first and second layer compositions. Zirconium component in both layers act as both washcoat stabilizer and promoter.

The specific construction of layers having the first and second compositions has been found to result in an effective three-way catalyst even when used with palladium as the sole platinum group metal-in each layer.

The at least one first and at least one second alkaline earth metal can be selected from the group consisting of magnesium, barium, calcium and strontium, preferably strontium and barium. Most preferably, the first alkaline earth metal component comprises barium oxide and the second alkaline earth metal component comprises strontium oxide. Stabilization means that the conversion efficiency of the catalyst composition of each layer is maintained for longer period of time at elevated temperatures. Stabilized supports such as alumina and catalytic components such as noble metals are more resistant to degradation against high temperature exposure thereby-maintaining better overall conversion efficiencies.

The first layer composition and second layer composition further respectively and preferably comprise first and second rare earth metal components which are believed to act as promoters. The rare earth metal components are derived from a metal selected from the group consisting of lanthanum and neodymium. In a specific embodiment, the first rare earth metal component is substantially lanthana and the second rare earth component is substantially neodymia. The promoter enhances the conversion of the hydrocarbons, carbon monoxide and nitrogen oxides to harmless compounds.

In specific and preferred embodiments the first and/or second layers further comprise nickel or iron components useful to remove sulfides such as hydrogen sulfides emissions. Most preferably, the first layer comprises a nickel or iron compound.

The first and second layer compositions can be applied as a coating to the metal substrate. The loaded proportions of ingredients are expressed as grams of material per square inch of the catalyst and the substrate. The catalyst composition can be coated as layers on a metal substrate generally which can comprise from about 0.1 to about 5, preferably about 0.3 to about 2 g/in$^2$ of catalytic composition based on grams of composition per square inch of the substrate surface. Platinum group metal components are based on the weight of the platinum group metal.

A useful and preferred first layer has:
from about 0.3 to about 3.0 mg/in$^2$ of at least one palladium component;
from 0 to about 2.0 mg/in$^2$ of at least one first platinum and/or first rhodium component;
from about 0.10 to about 2.0 g/in$^2$ of a first support;
from about 0.05 to about 1.0 g/in$^2$ of the total of the first oxygen storage components in the first layer;
from 0.0 and preferably about 0.0001 to about 0.01 g/in$^2$ of at least one first alkaline earth metal component;

from 0.0 and preferably about 0.0001 to about 0.3 g/in² of a first zirconium component; and from 0.0 and preferably about 0.0001 to about 0.2 g/in² of at least one first rare earth metal component selected from the group consisting of ceria metal components, lanthanum metal components and neodymium metal component.

A useful and preferred second layer has:

from about 0.05 m/in² to about 2.0 mg/in² of at least one second platinum group component selected from palladium, platinum and rhodium components with a second rhodium component preferred and a mixture of a second rhodium and second platinum component most preferred;

from about 0.10 g/in² to about 2.0 g/in² of a second support;

from 0.0 and preferably about 0.0001 g/in² to about 0.01 g/in² of at least one second rare earth metal component selected from the group consisting of lanthanum metal components and neodymium metal components;

from 0.0 and preferably about 0.0001 g/in² to about 0.01 g/in³ of at least one second alkaline earth metal component; and from 0.0 and preferably about 0.0001 to about 0.3 g/in² of a second zirconium component.

The first and/or second layer can nave from 0.0 to about 2.0 g/in³ of an oxygen storage composite comprising particulate form of cera-zirconia composite.

A preferred first or bottom coat composition comprises up to 0.5 mg/in² of a platinum component, up to 0.1 mg/in² of a rhodium component and from 0.5 to 2 mg/in² of a palladium component. The balance of the composition comprises 5 to 30 and preferably 10 to 15 percent of a composite comprising ceria, zirconia and a rare earth metal oxide selected from lantana and neodymia and mixtures thereof; from 5 to 40 and preferably 10 to 25, and more preferably 10 to 20 weight percent of bulk ceria; from 50 to 85 and preferably 55 to 75 weight percent of alumina; from up to 5 percent and preferably from 0.1 to 5 percent of lanthanum; and up to 5 and preferably 0.1 to 5 weight percent of zirconia. Useful bottom coat loadings are from at least 0.1 g/in² and can be in the range of from 0.3 to 5 g/in² with preferred loadings of the bottom coat being from 0.3 to 1 g/in² of substrate.

A preferred top coat composition comprises from 0.5 to 5, and preferably 0.5 to 2 mg/in² of platinum, up to about 5 and preferably 0.5 to 1.5 mg/in² of palladium and up to about 5, and preferably from 0.1 to 0.8 mg/in² of rhodium with a preferred composition having about 1.1 mg/in² of platinum, about 0.6 mg/in² of palladium and about 0.45 mg/in² of rhodium. The precious metal can be used with a top or second coat composition which comprises from 30 to 80 and preferably 30 to 50 and most preferably 35 to 45 percent of gamma alumina having a surface area of 150 m²/g and a pore volume of 0.462 cc/g, from 20 to 80 and preferably 30 to 50 weight percent of alumina having a surface area of 150 m²/g and a pore volume of 0.989 cc/g, up to 5 percent and preferably 0.1 to 5 percent of neodymia, up to 5 percent and preferably 0.1 to 5 percent lanthana, up to about 5 percent and preferably 0.1 to 5 percent of ceria which has introduced into the composition slurry as a water soluble compound, up to 5 percent and preferably 1 to 5 percent of barium oxide, up to 5 percent and preferably 0.1 to 5 percent of strontium oxide, up to 5 percent and preferably 0.1 to, 5 percent of zirconia. The loading of the top coat composition can be from 0.1 to 5 g/in² and is preferably in the range of 0.5 to 3 g/in² with a most preferred loading being 1 to 2 g/in².

The present invention includes a method of application of the tie coat and at least one catalytic layer to the metal substrate. The composition can be formed into slurries having from 25 to 50 and preferably 30 to 40 weight percent solids with the remainder being liquid, preferably an aqueous solution. The slurry can be applied to the metal substrate such as a metal plate by application means such as dipping the metal substrate into the slurry, painting the substrate using a paint brush or roller, or spraying the slurry onto the substrate. Where the layer has a relatively uniform composition, (e.g. there are no regions of large particles and small particles), a preferred application means is to spray the slurry onto the metal substrate. By controlling the spraying conditions, the refractory compound particles can agglomerate forming a porosity within the sprayed layer (stratum) by agglomerate-to-agglomerate porosity in addition to particle-to-particle porosity. In a particularly preferred embodiment, each layer is sprayed using a multiple of passes to result in the layer comprising a build up of a plurality of strata. It has been found that a significant control in spraying is the wetness of the stratum which is sprayed. Although the slurry has a certain moisture content, the wetness of the stratum should be such that it is received on the metal substrate at an incipient wetness level. As defined in U.S. Pat. No. 4,134,864, the incipient wetness of refractory compound stratum composition should be sufficiently dried to adsorb essentially all of the liquid which it contains upon being sprayed. That is, the amount of the liquid in the composition is such that the mixture has an essential absence of free or unabsorbed solution when the stratum is deposited on the substrate. A stratum of a refractory compound, such as alumina or catalyst compound containing a refractory support such as alumina, is sprayed on in a layer up to about 20 micrometers in thickness. The initial spraying is such that there is no wet sheen on the layer but the layer is still is wet and, in fact, has a translucent appearance. Upon drying, the layer turns white. The significance of this is that the structure of agglomerate porosity is preserved resulting in a relatively porous stratum. This is particularly significant when the last stratum is applied resulting in an outer surface which is relatively rough and is characterized by having agglomerates form peaks from 20 to about 500 micrometers. This is particularly significant since it has been found that the application of the outer catalytic stratum in this manner enhances its activity.

Upon passing through the top or second layer, the exhaust gas then contacts the first or bottom layer. In the bottom layer, the first palladium component and the optional first platinum component are believed to primarily enhance oxidation reactions. These reactions can be promoted by a first oxygen storage component such as ceria group compounds, preferably cerium oxide which can be in a bulk first oxygen storage composition form as used in the top layer, or be an oxygen storage component in intimate contact with the first platinum group metal component. Such intimate contact can be achieved by solution impregnation of the oxygen storage component onto the platinum group metal component.

The catalytic articles made by the present invention can be employed to promote chemical reactions, such as reductions, methanations and especially the oxidation of carbonaceous materials, e.g., carbon monoxide, hydrocarbons, oxygen-containing organic compounds, and the like, to products having a higher weight percentage of oxygen per molecule such as intermediate oxidation products, carbon dioxide and water, the latter two materials being relatively innocuous materials from an air pollution standpoint. Advantageously, the catalytic compositions can be used to provide removal from gaseous exhaust effluents of uncombusted or partially combusted carbonaceous fuel components such as carbon monoxide, hydrocarbons, and intermediate oxidation products composed primarily of carbon, hydrogen and oxygen, or nitrogen oxides. Although some oxidation or reduction reactions may occur at relatively low temperatures, they are often conducted at elevated temperatures of, for instance, at least about 150° C., preferably about 200° to 900° C., and generally with the feedstock in the vapor phase. The materials which are subject to oxidation generally contain carbon, and may, therefore, be termed carbonaceous, whether they are organic or inorganic in nature. The catalysts are thus useful in promoting the oxidation of hydrocarbons, oxygen-containing organic components, and carbon monoxide, and the reduction of nitrogen oxides. These types of materials may be present in exhaust gases from the combustion of carbonaceous fuels, and the catalysts are useful in promoting the oxidation or reduction of materials in such effluents. The exhaust from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. The products from the oxidation contain a greater weight ratio of oxygen to carbon than in the feed material subjected to oxidation. Many such reaction systems are known in the art.

The article comprising a metal substrate and catalyst as recited above is particularly useful wherein the catalyst is designed to catalyst the reaction of contaminants such as carbon monoxide and hydrocarbon and reduce nitrogen oxides in exhaust gases emanating from small engines.

The catalytic metal plate of the present invention is particularly useful in small engine applications. By small engine applications it is meant that the engines have less than about 50 and preferably less than 35 cubic centimeters of this placement. Since the engines are used in lightweight applications including handhold applications it is very important that the engine and its related equipment including catalytic converter is simple and lightweight. In such applications the surface of the metal to be catalyzed is relatively low and the flow rates are extremely high with exhaust gas flow rates ranging from 50,000 to 1,000,000 reciprocal hour space velocities. The catalyst must be highly active and stable for the coating to be beneficial.

The metal substrate of the present invention can include larger engine manifold surface and pipe surfaces coated. Smaller displacement engines and muffler components can be made catalytic as well. It is preferred however to catalyze a metal surface internally within the exhaust system which is not exposed to outer surfaces. The reason is that the catalytic oxidation results in the metal becoming too hot to touch. It is therefore preferred to use components inside the muffler such as perforated baffle plates to provide an opportunity for catalyzing the exhaust gases without adding additional hardware to the unit. By using already existing components on the exhaust system to catalyze the pollutant, the total engine weight is inperceptively increased to the end user.

Figure 2:
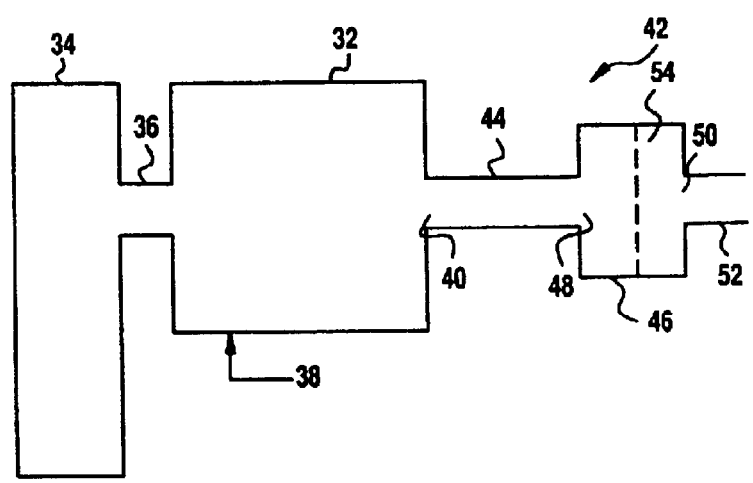
FIG. 2 illustrates an article of manufacture comprising an engine in combination with a muffler containing one catalyzed perforated plate.
Figure 3:
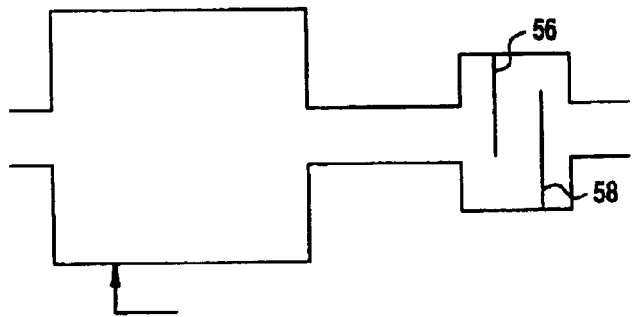
FIG. 3 is an engine in combination with a muffler containing catalyzed baffles of the present invention.

In particular, the present invention includes articles of manufacture which comprise an engine and exhaust system wherein the exhaust system comprises a catalyzed metal plate of the present invention. Such as articles which are particularly useful are small engines used in applications such as chain saws, lawn mowers, motorcycles, powerboat engines, generators, string mowers and the like. The articles of the present invention will be understood by those skilled in the art by reference to the accompanying FIGS. 2–8. Referring to FIG. 2 there is illustrated an engine 32 interconnected with an engine application 34 which can be selected from a chain saw, a lawn mower, a motorcycle, a generator, a string mower, an outboard motorboat motor and the like. There is a suitable drive mechanism 36 interconnected between the engine and engine application 34. The engine comprises an air intake 38, an exhaust port 40 and exhaust system generally shown as reference character 42. The exhaust system can contain an exhaust engine conduit 44 or an exhaust manifold (not shown) which communicates between the exhaust port and a muffler 46. The muffler has an entry port 48 and exhaust port which may be interconnected to an exhaust pipe 52. Typically, mufflers 46 contain plates or baffles. In accordance with the present invention as illustrated in FIG. 2 there is a perforated plate 54. In FIG. 3 the perforated plate is replaced by baffles 56 and 58. The perforated plate and baffles can comprise the catalyzed metal substrate of the present invention. FIGS. 4–8 illustrate specific embodiments of metal plates which can be catalyzed and used in communication with exhaust gases exiting exhaust port 40.

Figure 4:
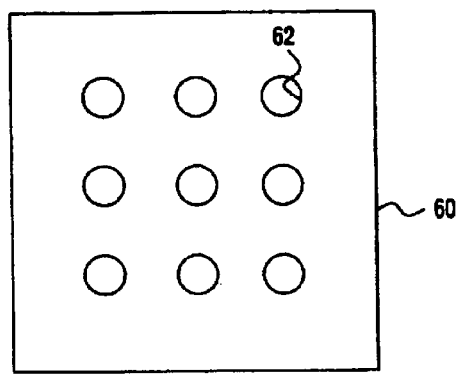
FIGS. 4 and 4A are top and side view of a perforated catalyzed metal plate of the present invention.
Figure 4A:
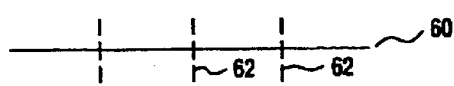
Figure 5A:
Figure 7A:
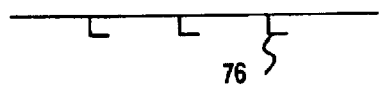
Figure 8A:
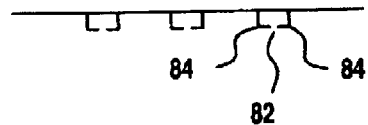

Referring to FIGS. 4 and 4A there is disclosed a metal plate 60 comprising a plurality of openings or holes 62 which permits the passage therethrough of gases containing components to be catalytically reacted. The metal substrate need not be plainer but can be in three dimensions as illustrated in FIG. 5 where a corrugated metal plate 64 is illustrated. FIGS. 6–8 illustrate metal plates which are perforated and in which the plate is bent at the perforation to create different types of louvers which can enhance contact of gases passing therethrough with the metal catalyzed substrate surface to enhance the catalytically converted reaction efficiency. FIG. 6 illustrates a plate 66 comprising a plurality of slots 68 wherein the metal on one or both edges of the slot is bent away from the plate 68 causing a depression 70. FIGS. 7 and 7A illustrate a plate 72 in which holes which 74 which are shown to be rectangular are punched into the metal plate. However, only part of the hole is punched and the plate which is located at the site of the hole is bent away in the form of a louver 76. An alternate embodiment of the plate shown in FIGS. 7 and 7A is illustrated in FIGS. 8 and 8A where plate 78 has a plurality of holes 80 wherein more than one portion of the plate removed to form the hole remains connected to the edge of the hole to form depressed slots 82 having 2 or more louvers 84. The metal plates of the present invention are preferably made of metals of the type recited above wherein there is an alumina surface to which a catalyst can be supported with a preferred embodiment further comprising a tie layer between the alumina substrate surface and the catalyst layer.

The present invention is illustrated further by the following examples which are not intended to limit the scope of this invention.

EXAMPLE 1

A catalyst composition was prepared as a tie layer or base coat. This composition was formed into a slurry comprising 35 percent alumina specified to have a particle size of 5 to 100 micrometers and a surface area of 150 m$^2$/g and 2 weight percent (based on $ZrO_2$) zirconia acetate as a binder with 14 weight percent acetic acid. The slurry was ballmilled for 24 hours to result in a particle size of 90 percent of the particles being less than 4 micrometers when using a Horiba laser particle size analyzer. The design of the metal plate was of the type shown in FIG. 4. The metal plate was 30 mils thick. The surface of the metal plate was roughened by sandblasting using 30 to 100 mesh alumina particles. The metal plate was then heated for 2 hours at 980° C. to form an alumina surface. The composition comprises iron and about 20.4 percent chromium, 5.2 percent aluminum, about 0.20 percent cerium, about 0.078 percent carbon, about 0.20 percent silica, less than. about 0.3 percent manganese and the maximum phosphorus amount being 0.020 percent and a maximum sulfur being about 0.005 percent.

An alumina tie coat slurry composition was applied as a thin coat to the metal plate surface to form a layer 50μ thick and slowly dried at 25° C. for about 0.5 hours in air. The coated alumina plate was then calcined at 525° C. for two hours to bond the alumina tie layer to the plate surface.

Two catalyst coatings were applied as a thin layer from a slurry having approximately 40 percent solids. The bottom coat not including precious metals contained a composite of ceria (20%)/zirconia (75%)/neodymia (5%) in an amount of 13.5% by weight, 17.3% by weight of ceria, 61.5% by weight of gamma alumina having a surface area of 150 m$^2$/g, 3.9% by weight of lanthana and 3.4% by weight of zirconia. To this was added sufficient precious metal to result in the bottom layer having 0.17 mg/in$^2$ of a platinum component, 0.85 mg/in$^2$ of a palladium component and 0.05 mg/in$^2$ of a rhodium component with the precious metal components being based on the metal. The bottom layer loading was about 0.6 g/in$^2$. The particle size of the refractory oxide in the bottom layer was about 7 micrometers.

The top or second layer composition contained 43.2% weight percent of gamma alumina having a surface area of 150 m$^2$/g, 41.5 weight percent of a second gamma alumina of equal surface area but greater macroporosity as indicated by total pore volume (cc/g) the lower porosity material has a pore volume of 0.462 cc/g and the higher porosity material has a pore volume of 0.989 cc/g, 0.3 weight percent of neodymia, 0.6 weight percent of lanthana, 2.9 percent by weight of ceria, (ceria introduced in a soluble form in the slurry), 3.2 weight percent of barium oxide, 0.3 weight percent of strontium oxide, 2.9 weight percent of zirconia and 5.1 weight percent of recycled catalyst composition. The composition contains sufficient precious metals to result in 1.1 mg/in$^2$ of a platinum component, 0.60 mg/in$^2$ of a palladium component and 0.45 mg/in$^2$ of a rhodium component with the amounts of the precious metal being based on the metal. The top layer loading was about 1.5 g/in$^2$. The particle size of the refractory oxide in the top coat was about 12 micrometers. The use of the greater pore size alumina in the top layer is designed to help increase the top layer porosity and to help resist poisoning at the outer surface.

The particle size of the refractory oxide in the bottom coat was 7 micrometers and the particle of the refractory oxide in the top coat was 12 micrometers.

EXAMPLE 2

Figure 9B:
FIGS. 9A and 9B is a microphotograph of the an original metal plate substrate used in Example 2.
Figure 9A:
Figure 10B:
FIGS. 10A and 10B is a microphotograph of the metal plate substrate shown in FIG. 9 after sandblasting
Figure 10A:
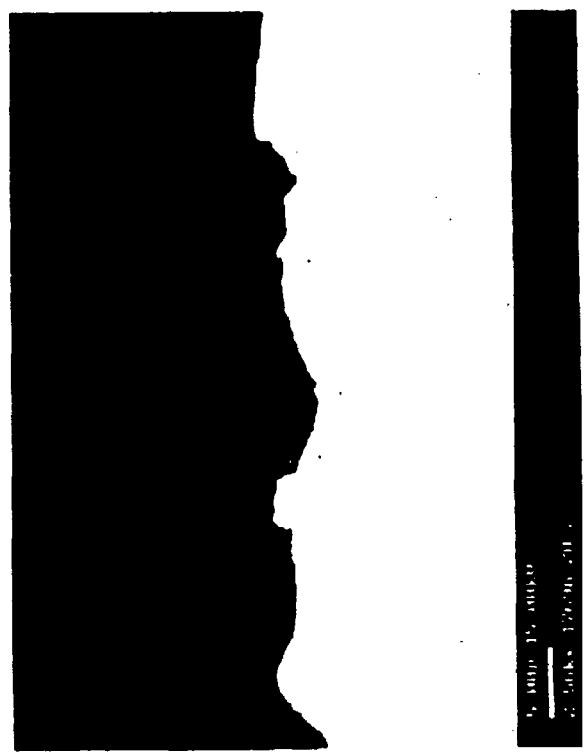
Figure 11A:
FIGS. 11A and 11B is a microphotograph of the metal plate substrate shown in FIG. 10 after calcining.
Figure 11B:
Figure 15:
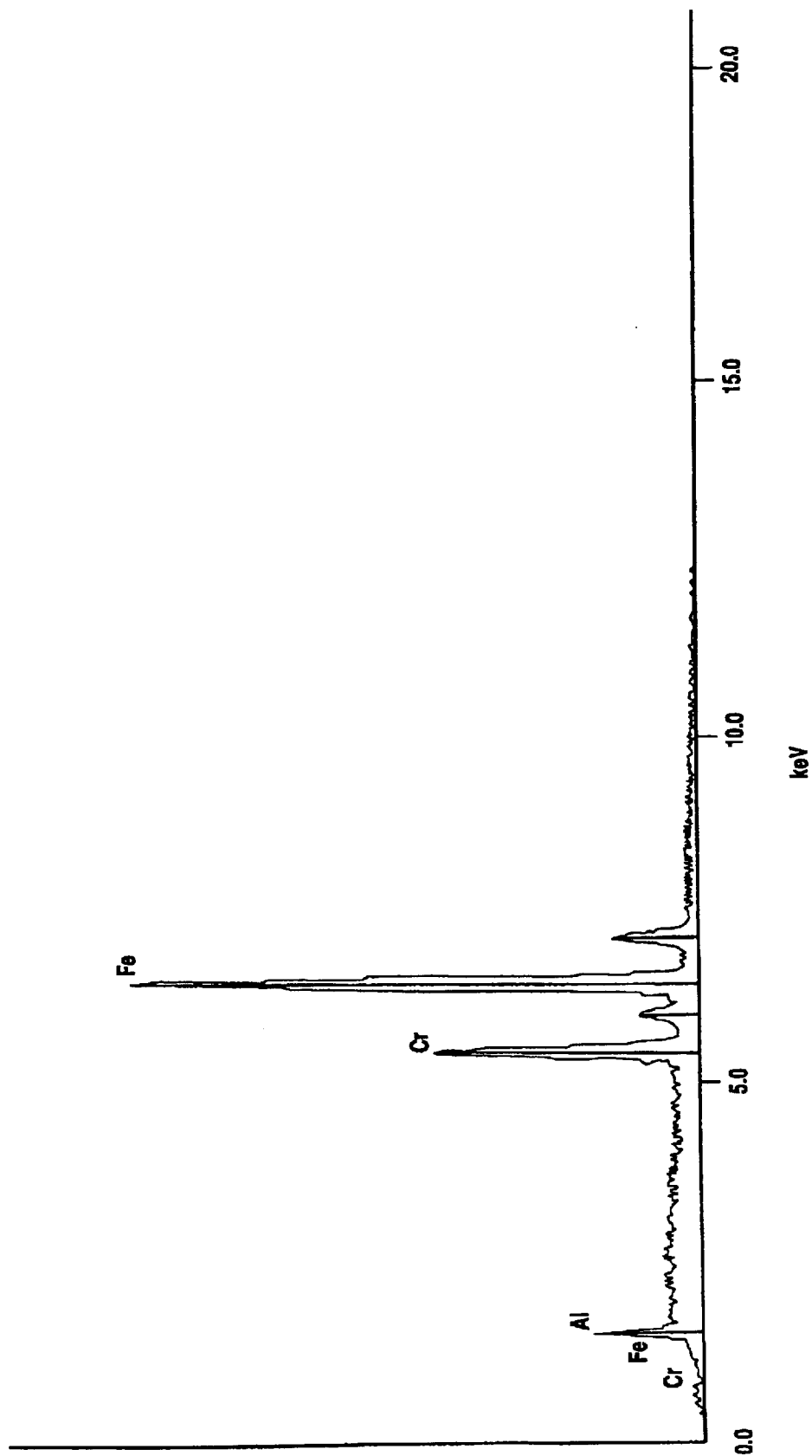
FIGS. 15 and 16 illustrate electron dispersive spectrascopy (EDS) results for the metal substrate used in Example 2.
Figure 16:
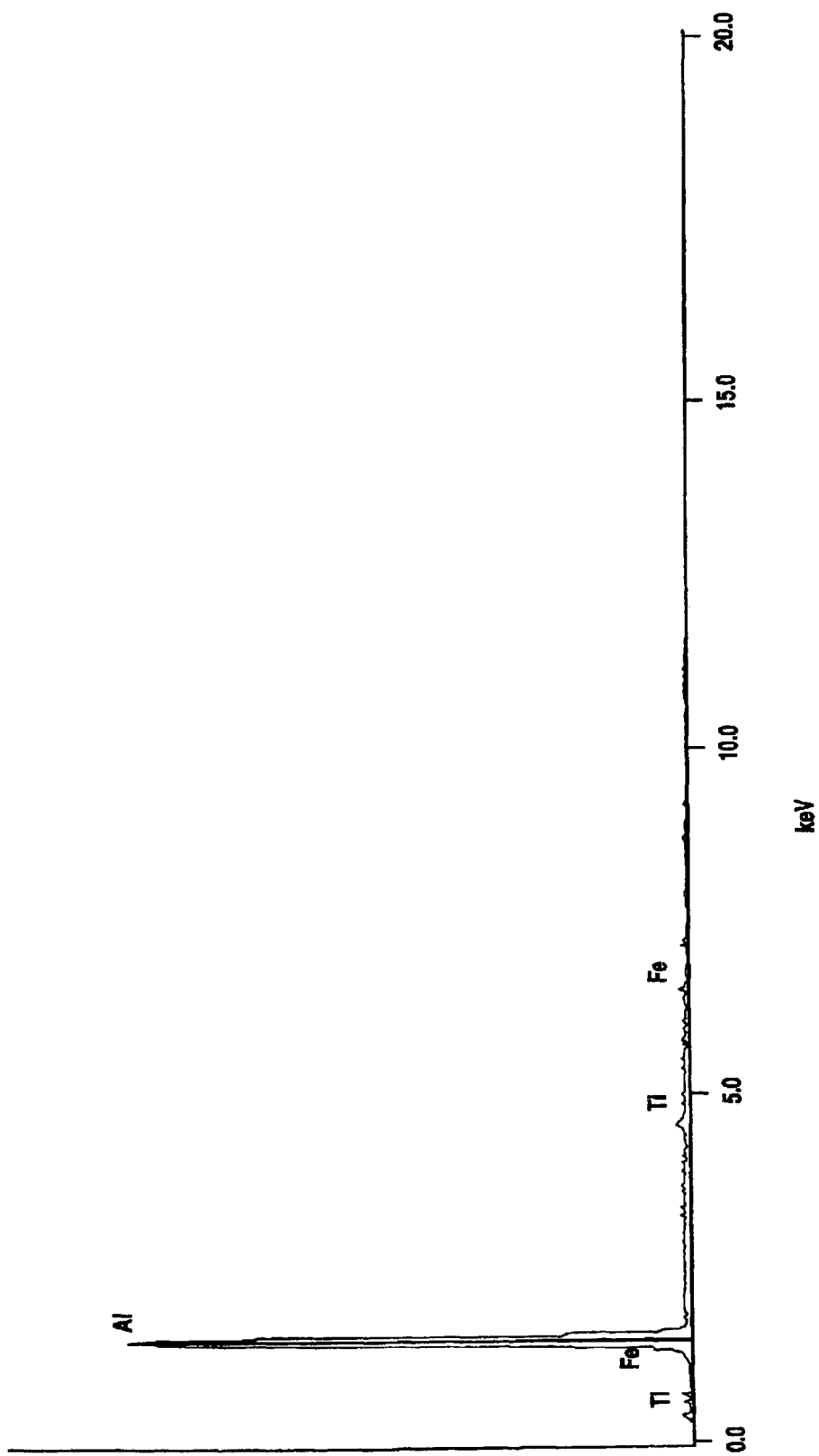

A coated metal plate for small engine applications was made using a metal plate made of a steel composition comprising the same composition as in Example 1. The metal plate was pressed into a final shape which is of the type illustrated in FIG. 17. A microphotograph of the clean surface is shown in FIGS. 9A and 9B. The metal plate was first sandblasted using a 30 to 100 mesh alumina to clean the surface and generate a random rough surface. The surface is shown in the microphotograph of FIGS. 10A and 10B. The metal plate was then calcined at 980° C. to generate an alumina bonding layer. A surface analysis by electron dispersive spectrascopy (EDS) indicated that the original metal was mainly iron, chromium and aluminum and the surface composition was not significantly changed by sandblast treatment. Upon heating the surface was mainly covered with aluminum indicating that the alumina inside the metal interior had migrated into the surface to form a protecting and binding layer. Microphotographs are shown in FIGS. 11A and 11B and the EDS results are illustrated in FIGS. 15–16.

Figure 12B:
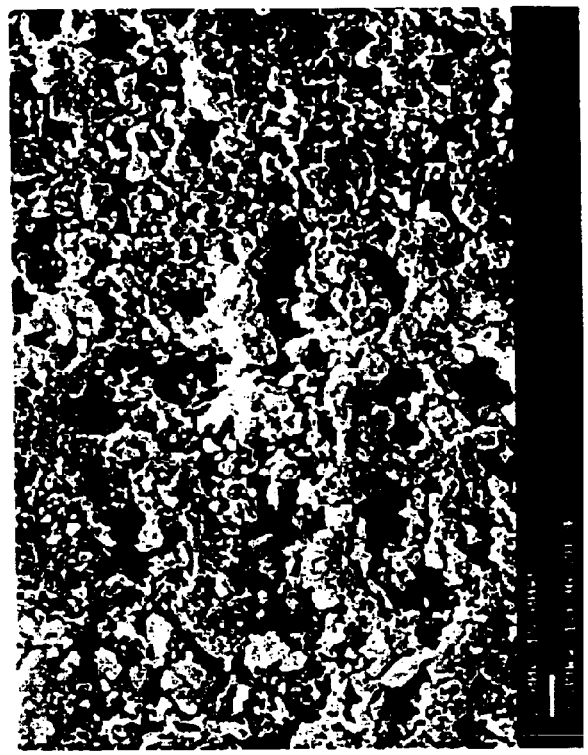
FIGS. 12A and 12B is a microphotograph of the metal plate substrate shown in FIG. 11 after application and calcining of the tie coat.
Figure 12A:
Figure 13B:
FIGS. 13A and 13B is a microphotograph of the metal plate substrate shown in FIG. 12 after application and calcining of the bottom coat.
Figure 13A:
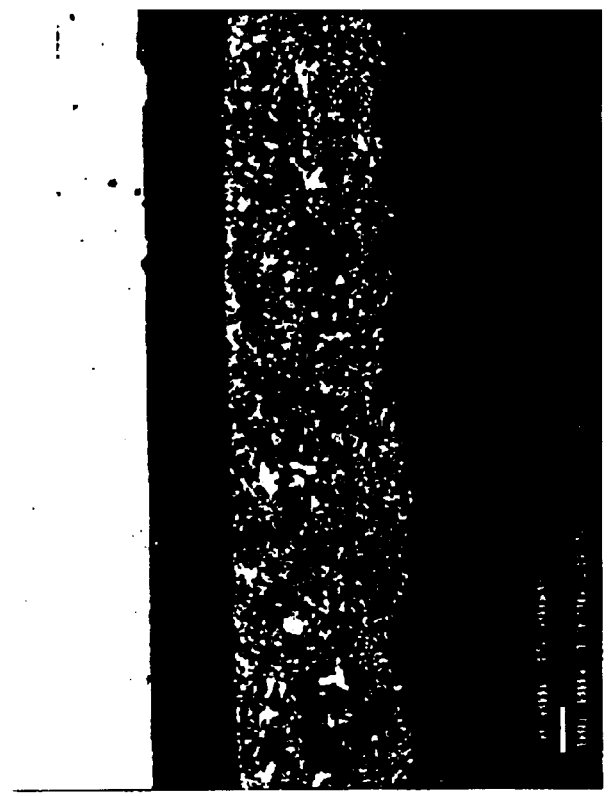
Figure 14B:
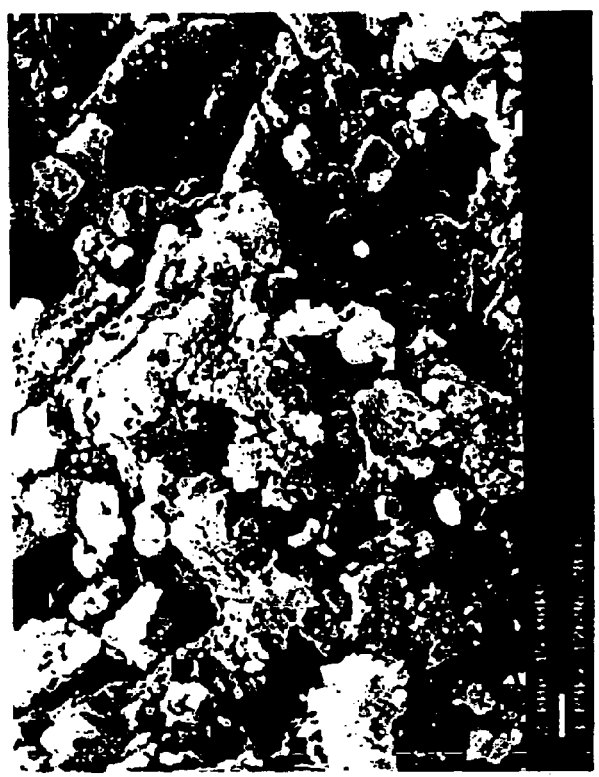
FIGS. 14A and 14B is a microphotograph of the metal plate substrate shown in FIG. 13 after application and calcining of the top coat.
Figure 14A:

An alumina tie layer having a composition comprising beta alumina was sprayed on the plate. The tie coat was sprayed first to have a uniform thin layer coverage throughout the plate on both sides. The tie coat had a dry gain of 0.5 grams and a thickness of about 50 micrometers. The plate had a surface area of 18 square inches and resulted in a 0.35 dry gain for each spray step. A second thin layer of tie coat was sprayed and was allowed to dry at room temperature resulting in a total gain for the tie coat of approximately 0.5 grams per piece. After drying the piece was calcined for two hours at 525° C. to fix the tie coat on the plate. A microphotograph of the tie layer is shown in FIGS. 12A and 12B. The plate was cooled and a thin layer of a bottom layer oxidation catalyst applied. The bottom layer catalyst composition was the same as in Example 1. The catalyst composition had a platinum to palladium ratio of 1:10. The composition was sprayed on the plate and was allowed to dry at room temperature. An additional thin layer of the bottom layer catalyst coating was sprayed on the plate and was allowed to dry at room temperature. This spray and dry cycle was repeated until the wet gain of bottom catalyst layer was approximately 0.7 grams. Upon completion of the coating of the bottom catalyst coat layer the oxidation catalyst was calcined at 525° C. for two hours. A microphotograph of the bottom coat layer is shown in FIGS. 13A and 13B. A top layer catalyst composition comprising having the same formulation as the top layer in Example 1 was sprayed on the plate using the same technique of repeatedly spraying thin layers and drying until there was a dry gain of approximately 0.35 grams per each spraying step. The target wet gain of the top coat layer was 1.5 grams. The final catalyst coated plate was calcined for two hours at 525° C. Example plates were coated after applying half the target weight of the top coat. The top coat is shown in FIG. 14.

FIGS. 9A and 9B are microphotographs, which also illustrate the surface of the original metal plate. FIGS. 10A and 10B are microphotographs which illustrate the metal plate after sandblasting with 30 to 100 mesh alumina. As can be seen the surface of the metal plate is significantly rougher after sandblasting. After sandblasting a thin layer of alumina was found on the surface to create a protective and binding layer for the washcoat. Reference is made to FIGS. 11A and 11B which are microphotographs which show the rough surface after calcining. FIGS. 12A and 12B are microphotographs which show the tie coat was tightly bonded to the plate and the tie coat was porous. FIGS. 13 and 14 respectively show the calcined bottom and top coats. The bottom coat and top coat compositions resulted in yet more porous layers and the binding between the washcoat layers was very tight indicating a good washcoat adhesion can be achieved by this coating process. The tie coat had a dry gain of 0.5 grams and a thickness of about 50 micrometers. The bottom catalytic coat had a dry gain of 0.75 grams and a thickness of about 80 micrometers, and the top coat had a dry gain of 1.5 grams and a thickness of about 160 micrometers.

EXAMPLE 3

Two coated metal plate catalyst samples were prepared and engine aged and evaluated. The fresh and aged activities of the samples were found to be satisfactory. Two perforated metal plates of the type shown in FIG. 4 were first treated with a sand blast gun using 30–100 mesh alumina to increase surface roughness. The plates were then calcined at 950° C. for two hours. The plate was cooled to room temperature and a thin coat comprising alumina having a surface area of 150 m³/g and a particle size of 90 percent of the particles less than 5 micrometers was applied with a paintbrush to form a tie layer. The alumina tie coat was allowed to dry. A bottom layer catalyst coat composition recited below was applied and allowed to dry followed by a top catalytic layer composition as recited below. Plate 1 had a blank weight of 32.84 grams. To this was added 0.353 grams of tie coat, 0.75 grams of a bottom catalytic coat and 1.52 grams of a top catalytic coat resulting in a total addition of 2.80 grams of coating materials. Plate 2 had a blank weight of 31.77 grams. To this was added 0.49 grams of top coat, 0.68 grams of bottom catalytic coat and 4.30 grams of a top catalytic coat for a total of 5.47 grams of coating. Plates 1 and 2 had thicknesses of 290 and 550 micron respectively. A slurry to form the tie coat comprised 150 m²/g alumina powder mixed with 14 percent acetic acid and deionized water to make a slurry containing about 50 percent solid and was subsequently milled for 24 hours to reduce the average particle size to about 90 percent of the particles being below 3.8 micrometers. The slurry was then diluted to 35 percent by weight solid content and applied to metal Plate 1 with a paintbrush. The coated plate was calcined at 450° C. for 2 hours.

The bottom and top catalyst coat compositions were made using four precious metal frit powders. Frit 1 was made using 407 grams of alumina having a particle-size of about 150 m³/g. This was mixed with 83.35 grams of palladium nitrate and 211.55 grams of lanthanum nitrate with 225 grams of deionized water. The precious metal solution was impregnated into the 470 grams of alumina powder. To this was added 10.12 grams of platinum amine compound diluted with 39.46 grams of deionized water and impregnated into the powder containing palladium and lanthanum. The powder was calcined for 2 hours at 450° C. Frit 1 contained 4.2 wt. % Pd, 0.4 wt. % Pt on alumina.

Frit 2 was prepared using 249.8 grams of ceria and 220 grams of zirconia. To this was added 11.2 grams of a platinum amine compound dissolved in 70.36 grams of deionized water. A dilute solution containing 19.30 grams of rhodium nitrate and 43.6 grams of deionized water was impregnated into the powder containing the platinum. The frit was calcined for 2 hours at 450° C. Frit 2 contained 0.4 wt. % Pt and 0.4 wt. % Rh on cerium zirconium composite.

Frit 3 was made using a mixture of alumina having a surface area of 150 m²/g mixed with 160.4 grams of alumina having a surface area of 160 m²/g and a pore volume of about 1.0 cc/g. To this was added 29.46 grams of platinum amine solution and 188 grams of deionized water. 24.7 grams of rhodium nitrate in 106 grams of deionized water was impregnated to the alumina powder containing platinum. Frit 3 was then calcined for 2 hours at 450° C. Frit 3 contained 1.4 wt. % Pt and 0.6 wt. % Rh on alumina.

Frit 4 was made using 236 grams of alumina having a surface area of 160 m²/g and a pore volume of 1.0 cc/g. At this point 16.53 grams of strontium nitrate crystal was dissolved in a solution containing 159.13 grams of palladium nitrate. Lanthanum nitrate was added to reach 265 grams followed by cerium nitrate to reach 475 grams and followed by zirconium acetate to reach 554.35 grams. 300 grams of the solution was then impregnated into the alumina powder. The mixture was calcined for 2 hours at 800° C. 1.42 grams of a platinum amine was dissolved in 265 grams of deionized water and impregnated into the solution containing strontium, palladium, lanthanum, cerium and zirconium. The final mixture was then calcined for 2 hours at 800° C. Frit 4 contained 0.5 wt. % of Pt and 4.8 wt. % of Pd on alumina having a surface area of 160 m²/g and a pore volume of 1.0 cc/g.

A bottom coat was prepared by forming a washcoat slurry formed by ballmilling Frits 1 and 2 together with cerium acetate and zirconium acetate solutions to result in a final average particle size of about 8 micrometers. The slurry was applied to the above Plate 1 containing a tie coat with a paintbrush and was calcined for 2 hours at 450° C. Frit 3 and Frit 4 was separately milled to reduce the average particle size to 90 percent of the particles being about 12 micrometers. A top coat catalytic washcoat slurry was prepared by mixing these two slurries together and it was applied to the plate with paintbrush. The top coat catalyst washcoat was applied at least twice before to obtain a final loading. The coated plate was again calcined at 450° C. for 2 hours. The bottom coat and top coat were applied to Plates 1 and 2 as recited above. The total amount of washcoat on Plate 1 included 0.015 grams of platinum, 0.015 grams of palladium and 0.0064 grams of rhodium. Plate 1 was engine aged on a grass trimmer engine for 400 hours operating under a loaded aging cycle. Results are summarized in Table 1. Fuel consumption is indicated in grams per hour and the conversion of hydrocarbon, carbon monoxide and NOx is summarized for Plate 1 in Table 1.

TABLE 1

| | P1 Plate | | | P4 Plate | |
|---|---|---|---|---|---|
| | Baseline | 0 Hr | 400 Hrs | Baseline | 0 Hr |
| | Fuel Consumption @ 500 g/hr | | | | |
| HC | 135 (g/kwh) | 45% | 30% | 125 | 40% |
| CO | 175 | 40% | 54% | 130 | 3.8% |
| NO$_x$ | 1.80 | 0% | −67% | 1.7 | 18% |
| | Fuel Consumption @ 550 g/hr | | | | |
| HC | 155 (g/kwh) | 39% | 23% | 140 | 36% |
| CO | 350 | 14% | 36% | 275 | −11% |
| NO$_x$ | 0.8 | 38% | 25% | 1.1 | 64% |
| | Fuel Consumption @ 600 g/hr | | | | |
| HC | 175 (g/kwh) | 29% | 14% | 155 | 29% |
| CO | 460 | 0% | 10% | 400 | 0% |
| NO$_x$ | 0.3 | 33% | 0% | 0.6 | 50% |

EXAMPLE 4

Figure 17:
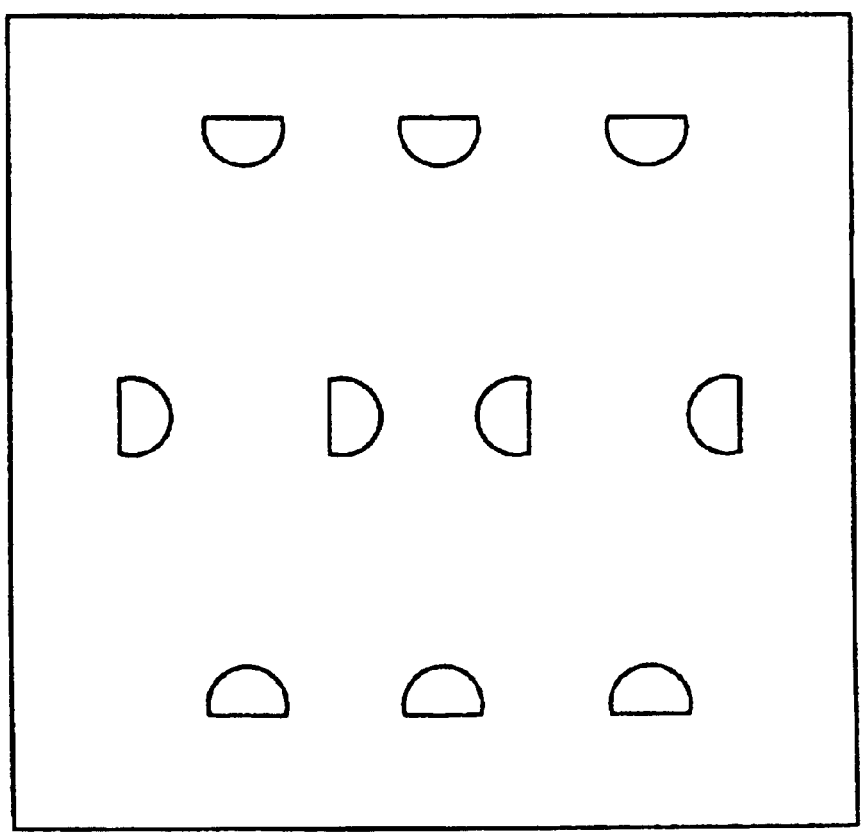
FIG. 17 is a plane view of the type of metal plate used in Example 4.
Figure 17:

A metal plate which can be used in an exhaust system muffler can be substantially rectangular and being approximately 40 millimeters by about 64 millimeters and having a thickness of about 0.75 millimeters and a plurality of slots of the type shown in FIG. 17. The composition can comprise iron and about 20.4 percent chromium, 5.2 percent aluminum, about 0.20 percent cerium, about 0.078 percent carbon, about 0.20 percent silica, less than about 0.3 percent manganese and the maximum phosphorus amount being 0.020 percent and a maximum sulfur being about 0.005 percent. The total area of the metal plate can be approximately 100 centimeters square (including both sides). The metal plate can be sandblasted to remove surface contaminant and create surface roughness. The metal plate can be heated at 980° C. in air for one hour to form an aluminum surface layer.

A catalyst for use on the plate of Example 4 comprises a tie coat, a bottom catalyst coat and a top catalyst coat. A slurry of tie coat composition comprising of fine alumina having a particle size where 90 percent of the particles were less than 5 micrometers and dilute acetic acid (14 percent by weight) was coated on the sandblasted metal plate and calcined at 525° C. at one hour in air. The tie coat layer can be about 50 micrometers thick and the total tie costs on the plate result in a weight gain of 0.5 grams. A useful plate in shown in FIG. 23.

The bottom coat can comprise 13.9 weight percent of a ceria zirconia composite, 17.3 percent of ceria, 61.5 percent of alumina having a surface area of about specified to be 150 $m^3/g$, 3.9 percent of lanthana, 3.4 of zirconia. The alumina is used as a support material for the precious metal compound and the precious metal supported aluminum particles preferably have a particle size of 90 percent of the particles being less than about 8 micrometers. The bottom coat can be provided using two slurries. The first slurry contains platinum and rhodium which is mixed with a ceria zirconium composite and ceria using 70 percent of a liquid for platinum and 30 percent of an impregnation liquid for rhodium. The platinum is impregnated first, acetic acid is added before the rhodium, water is added to the platinum rhodium ceria zirconium cerium mixture to give 45 percent solid content. A second slurry containing palladium and platinum with alumina is prepared by impregnating the palladium onto the alumina followed by the platinum. Palladium nitrate is mixed with lanthanum nitrate and used using a 80 percent impregnation liquid volume. Platinum is impregnated with about 20 percent of the impregnation liquid volume. Water is added to the palladium/platinum impregnated oxide to give 45 percent solids content and is milled to 90 percent of the particles of less than 10 microns. The slurries are combined and milled to 90 percent of the particles being less than 6 microns. The bottom coat slurry as recited above was made and the above metal plate was coated on both sides with a total dry weight gain of about 0.7 grams per piece. The bottom coated part was dried to 90 percent dry at 120° C. Calcination was conducted at 525° C. for about a minimum of 10 minutes.

A preferred topcoat comprises 43.2 percent alumina having a surface area specified to be 150 $m^3/g$, 41.5 percent of alumina specified to have a surface area of 160 $m^2/g$, 0.3 percent neodymia, 0.6 percent lanthana, 2.9 percent ceria, 3.2 barium-oxide, 0.3 percent strontium oxide, 2.9 percent zirconia and 5.1 percent of a recycle of waste of a composition having the above quantities. The top coat comprises 1.11 $mg/in^2$ platinum, 0.45 $mg/in^2$ rhodium and 0.60 $mg/in^2$ palladium.

The top coat can be made using four different slurries prepared separately before blending. The first slurry is a platinum and rhodium mixture on alumina having a particle size about 150 $m^2/g$ which comprises 60 weight percent of alumina having a pore volume of 0.462 cc/g and 40 weight percent based on the total alumina of alumina having a pore volume of 0.989 cc/g using 70 percent impregnation liquid for platinum and 30 percent impregnation liquid for rhodium. Platinum is impregnated first, acetic acid is added before the rhodium. Water is added to this platinum rhodium oxide mixture to give about 45 percent solid content and is milled until 90 percent of the particles are less than micrometers. A second slurry is prepared by making a palladium and platinum mixture on alumina where there are two types of alumina, 60 percent of the alumina being 150 $m^2/g$ and 40 percent being 160 $m^2/g$ having a pore volume of about 1.0 cc/g. The palladium is impregnated first and then followed by platinum. The palladium nitrate is first diluted with water to 80 percent of the impregnation volume and is added slowly over 15 minutes into a mixture of the two aluminas. Platinum is then impregnated with about 20 percent of the impregnation liquid volume. The palladium and platinum mixture is mixed with the mixture of neodymium nitrate, lanthanum nitrate, strontium nitrate and cerium nitrate together with a third slurry containing barium hydroxide, zirconium acetate and cerium acetate, acetic acid in water which are mixed to form a slurry having a uniform mixture. The resulting slurry is milled to 90 percent of the particles of less than 10 micrometers. Optionally, a fourth slurry of recycled top coat catalytic composition can be milled with diluted acetic acid of about a 4.5 pH to have a particle size of less than 8 micrometers.

The metal plate with the bottom coat slurry was then coated with the top coat slurry recited above to a dry weight of 1.5 grams per piece. The top coat coated piece was dried to 90 percent dry in a 120° C. air dryer followed by calcination at 525° C. for a minimum of 10 minutes.

What is claimed is:

1. An article comprising:
   a metal substrate, having a substrate surface comprising at least one metal oxide selected from the group consisting of alumina and rare earth metal oxides;
   a catalyst comprising at least one catalyst layer having an outer catalyst layer surface, the catalyst layer supported on the substrate surface; the catalyst comprising at least one catalytically active particulate material and outer the catalyst layer surface comprises agglomerates of the catalytically active particulate material having an average diameter of from about 20 to about 200 micrometers, and wherein the agglomerates at the outer catalyst layer surface adhere to each other to form peaks from about 20 to about 500 micrometers formed by depositing of at least two strata of the catalytically active particulate material with each strata being up to 20 micrometers in thickness.

2. The article as recited in claim 1 wherein the catalytically active material comprises at least one precious metal component and at least one refractory component.

3. The article as recited in claim 2 wherein the catalyst comprises at least two refractory components including a first refractory component and a second refractory component wherein the average particle size of the second refractory oxide component is greater than the average particle size of the first component.

4. The article as recited in claim 2 wherein the refractory component is selected from the group consisting of silica, alumina and titania compounds.

5. The article as recited in claim 4 wherein the refractory component is selected from the group consisting of alumina, silica, silica-alumina, alumina-silicates, alumina-zirconia, alumina-chromia, and alumina-ceria.

6. The article as recited in claim 5 wherein the refractory component is activated alumina.

7. The article as recited in claims 1 wherein the catalyst composition further comprises a nickel or iron component.

8. The article of claim 1 wherein the catalyst further comprises at least one component selected from the group consisting of:
   at least one rare earth metal component;
   an oxygen storage composition;
   at least one first stabilizer; and
   a compound containing zirconium.

9. The article as recited in claim 8 wherein at least one of said rare earth metal component is selected from the group consisting of lanthanum components and neodymium components.

10. The article as recited in claim 8 wherein the oxygen storage component is selected from the group consisting of cerium and praseodymium compounds.

11. The article as recited in claim 8 wherein the stabilizer is at least one alkaline earth metal component derived from a metal selected from the group consisting of magnesium, barium, calcium and strontium.

12. The article as recited in claim 8 further comprising a particulate composite of zirconia compound and rare earth oxide.

13. The article as recited in claim 12 wherein the rare earth oxide is ceria and, optionally, further comprises lanthana, neodymia and mixtures thereof.

14. The article as recited in claim 1 wherein the metal substrate is in the form of a metal plate at least 0.005 inches thick.

15. The article as recited in claim 14 wherein the metal plate is at least 0.025 inches thick.

16. The article as recited in claim 14 wherein the metal plate is corrugated.

17. The article as recited in claim 14 wherein the metal plate contains a plurality of holes.

18. The article as recited in claim 1 wherein the metal substrate is in the form of at least part of an exhaust system wall defining an exhaust stream passage, wherein the exhaust system wall of exhaust stream passage defines the substrate surface.

19. The article as recited in claim 1 wherein the metal substrate is in the form of a baffle plate of an exhaust system muffler.

20. The article as recited in claim 19 wherein the baffle plate is at least 0.025 inches thick.

21. The article as recited in claim 19 wherein the baffle plate is corrugated.

22. The article as recited in claim 19 wherein the baffle plate contains a plurality of holes.

23. A method comprising the steps of:
   depositing at least two strata of a catalyst on a substrate surface of a substrate to form a catalyst layer with each strata being up to 20 micrometers in thickness, the substrate surface comprising at least one metal oxide selected from the group consisting of alumina and rare earth metal oxides, and the catalyst comprising at least one catalytically active particulate material deposited to form agglomerates of the catalytically active particulate material having an average diameter of from about 20 to about 200 micrometers and wherein the agglomerates at the outer catalyst layer surface adhere to each other to form peaks from about 20 to about 500 micrometers.

24. The method as recited in claim 23 wherein the catalytically active material comprises
   at least one precious metal component; and
   at least one first refractory component.

25. The method as recited in claim 24 wherein the catalyst comprises at least two refractory components including a first refractory component and a second refractory component wherein the average particle size of the second refractory oxide component is greater than the average particle size of the first component.

26. The method as recited in claim 23 wherein the step of depositing at least two strata further comprises depositing an aqueous slurry of the catalyst to form each strata as a composition having an amount of fluid to be less than incipient wetness and repeating this step for each succeeding strata.

27. The method as recited in claim 23 wherein the step of depositing each stratum comprises spraying the slurry.

28. The method as recited in claim 23 further comprising the step of drying each stratum prior to depositing the succeeding stratum.

29. The method as recited in claim 23 wherein each stratum of the layer comprises the same catalyst composition.

30. The method as recited in claim 23 wherein the strata of the layer comprise different catalyst compositions.

31. The method as recited in claim 23 wherein there are at least two catalyst layers.

32. The method as recited in claim 23 further comprising the step of forming a tie layer comprising a refractory metal compound adjacent to the substrate surface and between the substrate surface and the catalyst.

33. The method as recited in claim 23 further comprising the step of roughening the substrate surface to form a rough substrate surface.

34. The method as recited in claim 33 further wherein the step of roughening the substrate surface comprises sandblasting the surface.

35. The method as recited in claim 33 further wherein the step of roughening the substrate surface comprises chemically treating the surface.

36. The method as recited in claim 23 further comprising the step of calcining the rough substrate surface to form a layer comprising alumina on a substrate surface.

37. The method as recited in claim 36 wherein the step of calcining the substrate is conducted from about 800° C. to about 1100° C. for from 0.5 hours to about 10.0 hours.

38. The method as recited in claim 23 further comprising the step of calcining the at least one catalyst layer.

39. The method as recited in claim 38 further comprising the steps of forming and then calcining the at least one bottom layer followed by forming and then calcining the at least one top layer.

40. The method as recited in claim 23 further comprising the step of adding to the catalyst at least one of the following materials to selected from the group consisting of:
   at least one rare earth metal component;
   an oxygen storage composition;
   at least one stabilizer; and
   a compound containing zirconium.

41. A method comprising the steps of:
   contacting a gas containing at least one component selected from the group consisting of nitrogen oxide, carbon monoxide and/or hydrocarbon with an article comprising:
   a metal substrate, having a substrate surface comprising at least one metal oxide selected from the group consisting of alumina and a rare earth metal;
   a catalyst comprising at least one catalyst layer having an outer catalyst layer surface, the catalyst layer supported on the substrate surface; the catalyst comprising at least one catalytically active particulate material and the outer catalyst layer surface comprises agglomerates of the catalytically active particulate material having an average diameter of from about 20 to about 200 micrometers, and wherein the agglomerates at the outer catalyst layer surface adhere to each other to form peaks from about 20 to about 500 micrometers formed by depositing of at least two strata of the catalytically active particulate material with each strata being up to 20 micrometers in thickness.

* * * * *